United States Patent
Hirata et al.

(10) Patent No.: US 12,546,925 B2
(45) Date of Patent: Feb. 10, 2026

(54) INFORMATION DISPLAY DEVICE

(71) Applicant: Maxell, Ltd., Kyoto (JP)

(72) Inventors: Koji Hirata, Kyoto (JP); Masahiko Yatsu, Kyoto (JP); Toshinori Sugiyama, Kyoto (JP); Tomoki Yamamoto, Kyoto (JP); Toshimasa Nagai, Kyoto (JP); Chohei Ono, Kyoto (JP); Hiroyuki Kajikawa, Kyoto (JP); Naoyuki Ogura, Kyoto (JP)

(73) Assignee: MAXELL, LTD., Kyoto (JP)

( * ) Notice: Subject to any disclaimer, the term of this patent is extended or adjusted under 35 U.S.C. 154(b) by 602 days.

(21) Appl. No.: 17/915,524

(22) PCT Filed: Mar. 24, 2021

(86) PCT No.: PCT/JP2021/012419
§ 371 (c)(1),
(2) Date: Sep. 29, 2022

(87) PCT Pub. No.: WO2021/200515
PCT Pub. Date: Oct. 7, 2021

(65) Prior Publication Data
US 2023/0118416 A1     Apr. 20, 2023

(30) Foreign Application Priority Data
Apr. 3, 2020   (JP) .................. 2020-067148

(51) Int. Cl.
*G02B 1/18*        (2015.01)
*B60K 35/10*    (2024.01)
(Continued)

(52) U.S. Cl.
CPC .............. *G02B 1/18* (2015.01); *B60K 35/10* (2024.01); *B60K 35/22* (2024.01); *B60K 35/23* (2024.01);
(Continued)

(58) Field of Classification Search
CPC ..... G02B 27/00–648; G02B 2027/0105–0198; B60K 35/00–90; B60K 2360/00–96
See application file for complete search history.

(56) References Cited

U.S. PATENT DOCUMENTS 10,890,763 B2   1/2021  Hirata et al.
11,487,115 B2  11/2022  Misawa
(Continued)

FOREIGN PATENT DOCUMENTS

CN   109952527 A   6/2019
JP   2004-271558 A  9/2004
(Continued)

OTHER PUBLICATIONS

Office Action issued Jan. 11, 2025 in Chinese Patent Application No. 202180026813.6 with English translation thereof.

(Continued)

*Primary Examiner* — Christopher A Lamb, II
(74) *Attorney, Agent, or Firm* — XSENSUS LLP

(57) ABSTRACT

An information display device that displays image information as a virtual image on a projection surface, the device including: an opening portion at a part of the housing, image light generating means for generating image light, image light processing means for performing a predetermined optical process on the image light, and image projecting means for projecting the image light such that a viewer can recognize the image information as the virtual image in front of the projection surface, and an optical element in which a reflective polarizing plate is fixed to a substrate having a transmissive property with an adhesive agent or with a pressure-sensitive adhesive agent is provided in a part of an optical path inside the housing, as means for selectively reflecting a P-polarized light component of light in a visible (Continued)

light region, and a moisture-proof film is provided on a surface of the reflective polarizing plate.

17 Claims, 23 Drawing Sheets

(51) Int. Cl.
  *B60K 35/22* (2024.01)
  *B60K 35/23* (2024.01)
  *B60K 35/28* (2024.01)
  *B60K 35/60* (2024.01)
  *B60K 35/80* (2024.01)
  *G02B 5/30* (2006.01)
  *G02B 27/01* (2006.01)

(52) U.S. Cl.
  CPC .............. *B60K 35/28* (2024.01); *B60K 35/60* (2024.01); *B60K 35/80* (2024.01); *G02B 5/3025* (2013.01); *G02B 27/0101* (2013.01); *B60K 2360/785* (2024.01); *B60Y 2200/11* (2013.01); *G02B 2027/0118* (2013.01); *G02B 2027/014* (2013.01)

(56) References Cited

U.S. PATENT DOCUMENTS

| | | | |
|---|---|---|---|
| 2004/0174596 A1 | 9/2004 | Umeki | |
| 2010/0225886 A1 | 9/2010 | Kumai | |
| 2013/0279016 A1* | 10/2013 | Finger | G02B 5/30 359/630 |
| 2016/0195719 A1 | 7/2016 | Yonetani | |
| 2018/0180878 A1 | 6/2018 | Yokoe et al. | |
| 2018/0210201 A1 | 7/2018 | Togasaki et al. | |
| 2019/0129169 A1 | 5/2019 | Kusafuka et al. | |
| 2020/0026077 A1 | 1/2020 | Christmas et al. | |
| 2020/0159013 A1 | 5/2020 | Hirata et al. | |
| 2020/0319378 A1* | 10/2020 | Seo | C09D 7/70 |
| 2021/0191250 A1* | 6/2021 | Kurita | G03B 33/12 |

FOREIGN PATENT DOCUMENTS

| | | |
|---|---|---|
| JP | 2007-65011 A | 3/2007 |
| JP | 2010-210706 A | 9/2010 |
| JP | 2015-7763 A | 1/2015 |
| JP | 2015-194707 A | 11/2015 |
| JP | 2018-72507 A | 5/2018 |
| JP | 2020-13118 A | 1/2020 |
| WO | 2016/208133 A1 | 12/2016 |
| WO | 2017/086002 A1 | 5/2017 |
| WO | 2017/188277 A1 | 11/2017 |
| WO | 2018/008236 A1 | 1/2018 |
| WO | 2018/029999 A1 | 2/2018 |

OTHER PUBLICATIONS

International Search Report and Written Opinion mailed on May 25, 2021, received for PCT Application PCT/JP2021/012419, filed on Mar. 24, 2021, 12 pages including English Translation.

Office Action issued May 21, 2024 in Japanese Patent Application No. 2020-067148 with English translation.

* cited by examiner

FIG. 7

| NAME | SURFACE NUMBER | SHAPE | CURVATURE RADIUS | INTER-SURFACE DISTANCE | GLASS MATERIAL NAME | CONTENTS OF ECCENTRICITY/ SLANT | ECCENTRICITY (mm) | | | SLANT (DEGREES) | | |
|---|---|---|---|---|---|---|---|---|---|---|---|---|
| | | | | | | | X-AXIS | Y-AXIS | Z-AXIS | ROTATION AROUND X-AXIS | ROTATION AROUND Y-AXIS | ROTATION AROUND Z-AXIS |
| VIRTUAL IMAGE SURFACE | SURFACE 0 | FLAT SURFACE | ∞ | 20000 | | | 0 | 0 | 0 | 0 | 0 | 0 |
| ENTRANCE PUPIL | SURFACE 1 | FLAT SURFACE | ∞ | -746.118 | | GENERAL ECCENTRICITY | 0 | 0 | 0 | -2.376 | 0 | 0 |
| WINDSHIELD | SURFACE 2 | FREE-FORM SURFACE | ∞ | 0 | REFLECTION | DECENTER-AND-RETURN | -370 | 0 | -31.65 | 0 | 0 | 0 |
| DUMMY SURFACE | SURFACE 3 | FREE-FORM SURFACE | ∞ | 370.081 | | GENERAL ECCENTRICITY | 0 | 0 | 0 | -136.99 | 14.157 | -46.686 |
| MIRROR | SURFACE 4 | FREE-FORM SURFACE | -755.447 | 0 | REFLECTION | DECENTER-AND-RETURN | 0 | 0 | 0 | -37.558 | -49.545 | 0 |
| DUMMY SURFACE | SURFACE 5 | FREE-FORM SURFACE | ∞ | -235.821 | | GENERAL ECCENTRICITY | 0 | 0 | 0 | -22.259 | -18.429 | 0 |
| MIRROR | SURFACE 6 | FREE-FORM SURFACE | 1937.471 | 0 | REFLECTION | DECENTER-AND-RETURN | 0 | 0 | 0 | 20.243 | 7.679 | 54.336 |
| DUMMY SURFACE | SURFACE 7 | FLAT SURFACE | ∞ | 195.029 | | GENERAL ECCENTRICITY | 0 | 0 | 0 | 18.595 | -7.947 | 0 |
| LENS BALL | SURFACE 8 | SPHERICAL SURFACE | -196.735 | 6.500 | PMMA25 | GENERAL ECCENTRICITY | -5.5384 | -6.884 | 0 | 5.212 | 26.186 | 1.562 |
| | SURFACE 9 | FLAT SURFACE | ∞ | 1.240 | | GENERAL ECCENTRICITY | 11.5.3 | 72.786 | 0 | 0 | 0 | 0 |
| POLARIZING UNIT | SURFACE 10 | FLAT SURFACE | ∞ | 0.400 | 54.47 | | 0 | 0 | 0 | 0 | 0 | 0 |
| | SURFACE 11 | FLAT SURFACE | ∞ | 0.135 | | | 0 | 0 | 0 | 0 | 0 | 0 |
| | SURFACE 12 | FLAT SURFACE | ∞ | 0.700 | EAGLE_XG | | 0 | 0 | 0 | 0 | 0 | 0 |
| | SURFACE 13 | FLAT SURFACE | ∞ | 2.000 | | | 0 | 0 | 0 | 0 | 0 | 0 |
| | SURFACE 14 | FLAT SURFACE | ∞ | 0.122 | 50.30 | | 0 | 0 | 0 | 0 | 0 | 0 |
| POLARIZING PLATE BASE MATERIAL | SURFACE 15 | FLAT SURFACE | ∞ | 0.600 | 52.649 | | 0 | 0 | 0 | 0 | 0 | 0 |
| | SURFACE 16 | FLAT SURFACE | ∞ | 0.000 | | | 0 | 0 | 0 | 0 | 0 | 0 |
| INTER-MEDIATE IMAGE | SURFACE 17 | FLAT SURFACE | ∞ | 0.000 | | | 0 | 0 | 0 | 0 | 0 | 0 |

FIG. 8

| CODE | | MIRROR SURFACE (SURFACE 2) | MIRROR SURFACE (SURFACE 4) | MIRROR SURFACE (SURFACE 6) |
|---|---|---|---|---|
| R | 1/c | ∞ | −755.447 | 1907.471 |
| K | K | | | |
| C2 | $X$ | | 1.25953E+00 | |
| C3 | $Y$ | 1.71371E+00 | −2.81733E−02 | |
| C4 | $X^2$ | 2.11497E−04 | −1.04133E−03 | −1.26442E−04 |
| C5 | $XY$ | | 2.35227E−04 | −6.42484E−04 |
| C6 | $Y^2$ | 6.59378E−04 | −3.36294E−05 | 1.71447E−04 |
| C7 | $X^3$ | | 2.09315E−06 | 6.12582E−07 |
| C8 | $X^2Y$ | 4.25207E−08 | 1.33709E−06 | 2.67252E−06 |
| C9 | $XY^2$ | | −1.47048E−06 | 1.01803E−06 |
| C10 | $Y^3$ | 1.26547E−06 | 7.63174E−07 | 1.94118E−06 |
| C11 | $X^4$ | 1.64270E−10 | 4.75133E−10 | 3.97592E−08 |
| C12 | $X^3Y$ | | 2.42697E−09 | 5.03494E−08 |
| C13 | $X^2Y^2$ | 6.15087E−10 | −3.64203E−09 | 1.29003E−08 |
| C14 | $XY^3$ | | 1.52920E−08 | −2.02078E−08 |
| C15 | $Y^4$ | 2.83442E−09 | −3.50653E−09 | 1.03880E−08 |
| C16 | $X^5$ | | 4.70307E−11 | −1.84142E−10 |
| C17 | $X^4Y$ | 3.26009E−13 | 3.32731E−11 | −1.59150E−10 |
| C18 | $X^3Y^2$ | | −8.87863E−11 | 3.38578E−10 |
| C19 | $X^2Y^3$ | 4.31944E−13 | 1.36369E−10 | 4.55269E−10 |
| C20 | $XY^4$ | | −2.28233E−10 | 5.90421E−11 |
| C21 | $Y^5$ | 6.34787E−12 | 5.07399E−11 | 1.85172E−10 |
| C22 | $X^6$ | −1.79571E−16 | 2.03620E−12 | −9.18647E−13 |
| C23 | $X^5Y$ | | 1.11930E−12 | 2.73804E−13 |
| C24 | $X^4Y^2$ | 1.01472E−15 | −3.71392E−12 | −2.28358E−13 |
| C25 | $X^3Y^3$ | | −1.50347E−13 | −1.91662E−13 |
| C26 | $X^2Y^4$ | 2.09594E−15 | 1.68424E−12 | −3.22905E−14 |
| C27 | $XY^5$ | | 4.74714E−14 | −1.46381E−12 |
| C28 | $Y^6$ | 2.84130E−14 | 8.60663E−14 | 1.20752E−12 |
| C29 | $X^7$ | | 1.08984E−14 | 9.14982E−15 |
| C30 | $X^6Y$ | 2.46373E−19 | −3.41792E−14 | −1.59473E−14 |
| C31 | $X^5Y^2$ | | −3.40343E−14 | −4.93239E−15 |
| C32 | $X^4Y^3$ | 4.84044E−18 | 4.03017E−14 | 8.38838E−15 |
| C33 | $X^3Y^4$ | | 1.05545E−14 | 6.97905E−15 |
| C34 | $X^2Y^5$ | 1.26319E−17 | −1.48229E−14 | −1.23910E−15 |
| C35 | $XY^6$ | | 1.75517E−15 | −6.31696E−15 |
| C36 | $Y^7$ | 1.77903E−16 | −9.56099E−16 | 6.43321E−15 |
| C37 | $X^8$ | 2.18437E−22 | 1.56878E−16 | −1.54129E−17 |
| C38 | $X^7Y$ | | −2.95528E−16 | 9.31649E−17 |
| C39 | $X^6Y^2$ | 1.18014E−21 | 5.03957E−16 | −7.72250E−17 |
| C40 | $X^5Y^3$ | | −2.37349E−16 | 2.03982E−17 |
| C41 | $X^4Y^4$ | 8.45508E−21 | 8.09206E−17 | 1.03375E−16 |
| C42 | $X^3Y^5$ | | −4.32573E−18 | −4.39516E−17 |
| C43 | $X^2Y^6$ | 2.05883E−20 | −8.88028E−17 | −9.02513E−17 |
| C44 | $XY^7$ | | 6.34961E−17 | 4.33443E−17 |
| C45 | $Y^8$ | 4.65954E−19 | −1.10064E−17 | 5.05230E−17 |
| C46 | $X^9$ | | 1.09382E−19 | 7.56087E−20 |
| C47 | $X^8Y$ | | −1.30295E−18 | 2.92719E−19 |
| C48 | $X^7Y^2$ | | 2.17407E−18 | 1.03826E−18 |
| C49 | $X^6Y^3$ | | −2.10895E−18 | −2.30419E−19 |
| C50 | $X^5Y^4$ | | 1.99771E−19 | 6.07464E−20 |
| C51 | $X^4Y^5$ | | 1.71082E−18 | 1.70643E−18 |
| C52 | $X^3Y^6$ | | −1.78696E−18 | 6.70262E−19 |
| C53 | $X^2Y^7$ | | 8.93036E−19 | −1.15468E−18 |
| C54 | $XY^8$ | | −2.99811E−19 | −5.03954E−19 |
| C55 | $Y^9$ | | 6.24459E−20 | −2.11913E−21 |
| C56 | $X^{10}$ | | 9.97285E−21 | −1.69648E−22 |
| C57 | $X^9Y$ | | −1.87270E−20 | −1.74471E−21 |
| C58 | $X^8Y^2$ | | 9.23135E−21 | −4.27958E−21 |
| C59 | $X^7Y^3$ | | −9.25386E−22 | 2.51079E−23 |
| C60 | $X^6Y^4$ | | −1.32031E−21 | 4.49977E−21 |
| C61 | $X^5Y^5$ | | 6.29132E−21 | 1.26466E−21 |
| C62 | $X^4Y^6$ | | −8.34894E−21 | −2.54772E−21 |
| C63 | $X^3Y^7$ | | 2.53867E−21 | −1.89300E−22 |
| C64 | $X^2Y^8$ | | 1.54568E−21 | 2.61127E−21 |
| C65 | $XY^9$ | | −8.72158E−22 | 2.87462E−21 |
| C66 | $Y^{10}$ | | 7.04802E−23 | 8.18999E−22 |

FIG. 9
(a)
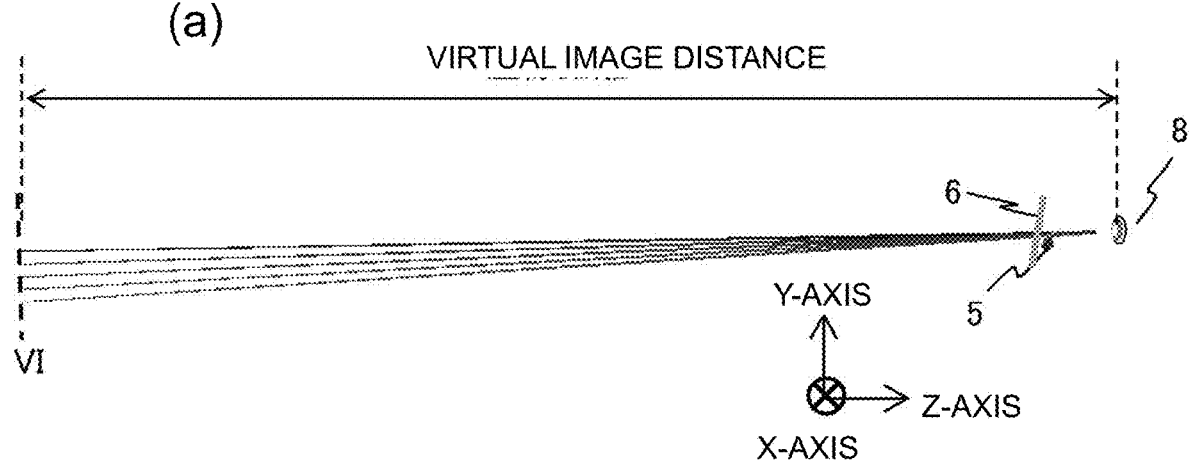
(b)
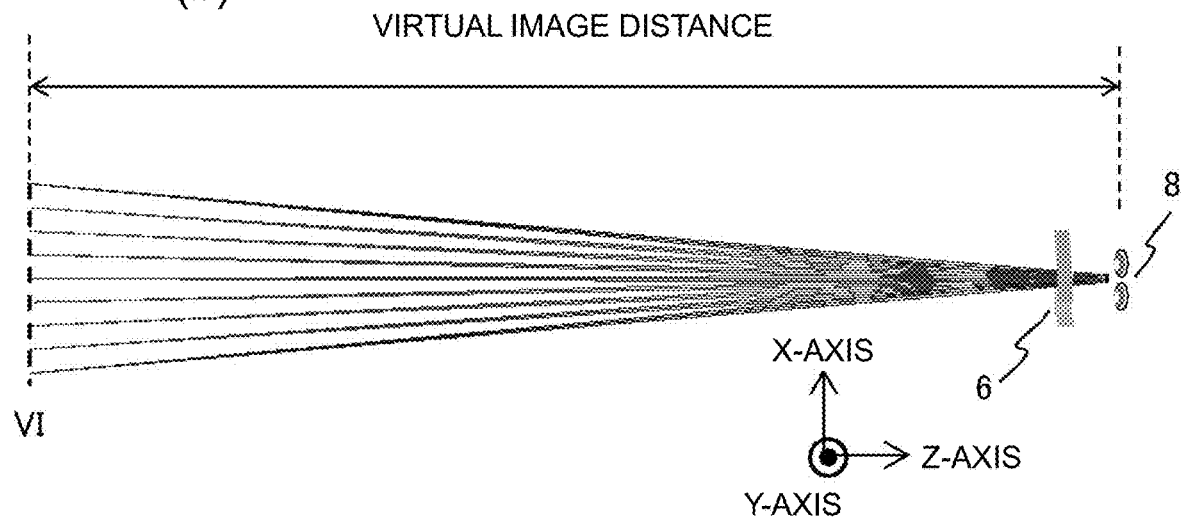

FIG. 11
DISTORTION AMOUNT OF OPTICAL SYSTEM
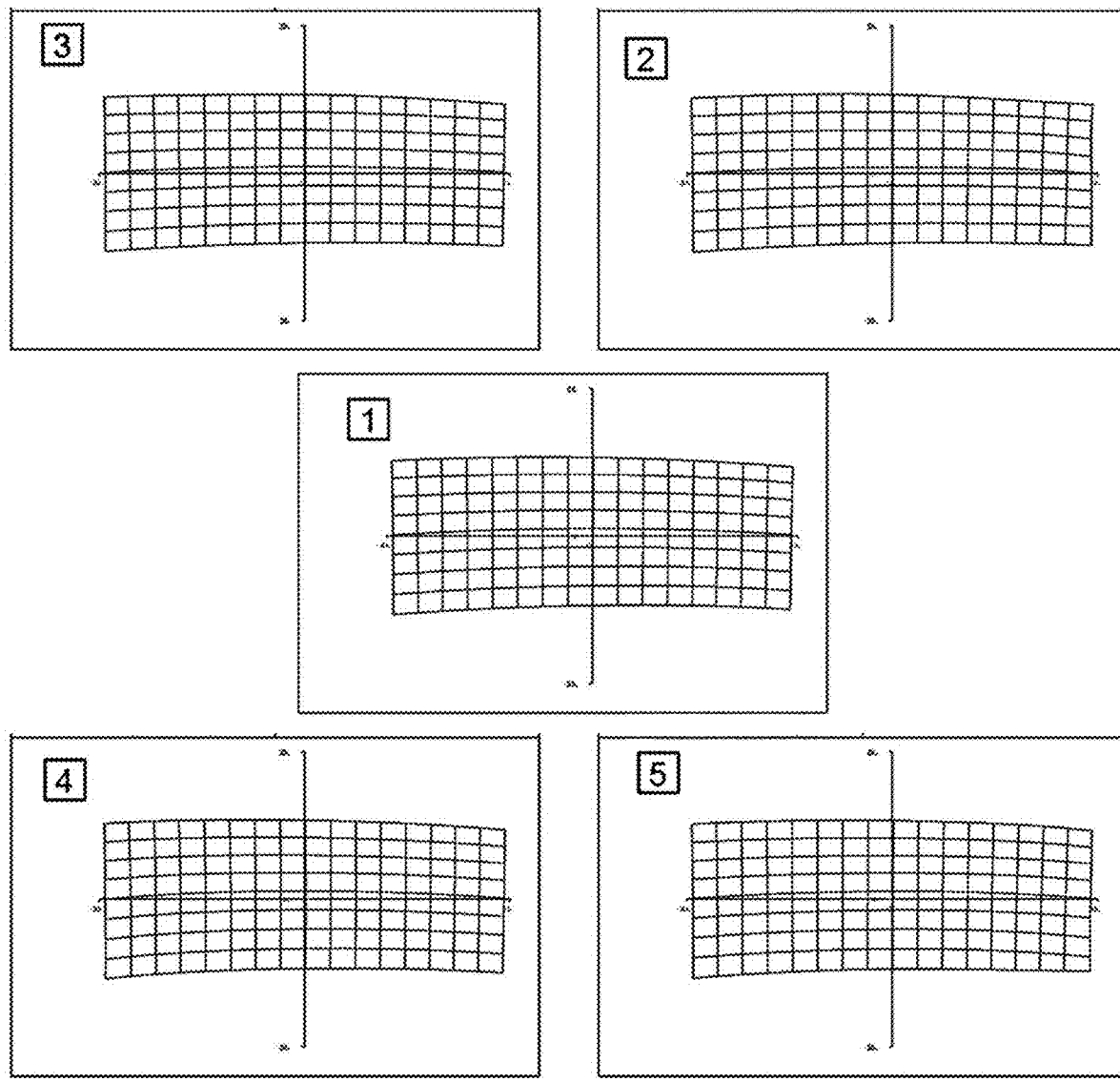
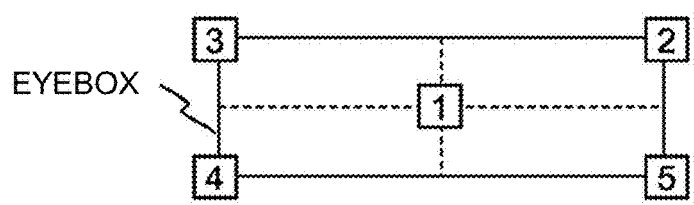

FIG. 12
IMAGE FORMING PERFORMANCE OF OPTICAL SYSTEM
(a) R LIGHT
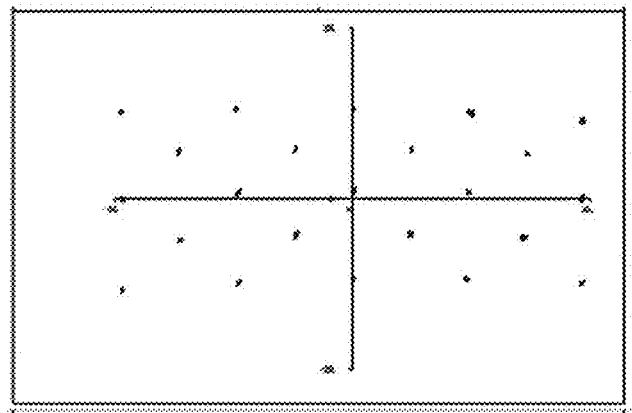
(b) G LIGHT
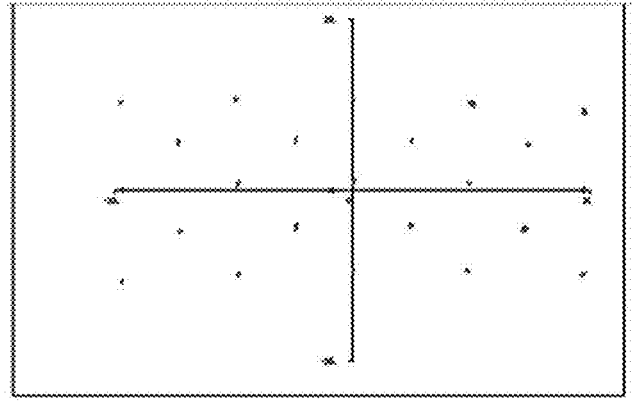
(c) B LIGHT
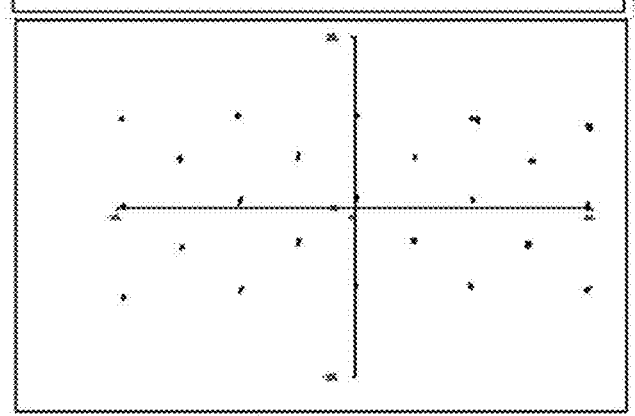
VISUAL FIELD RANGE
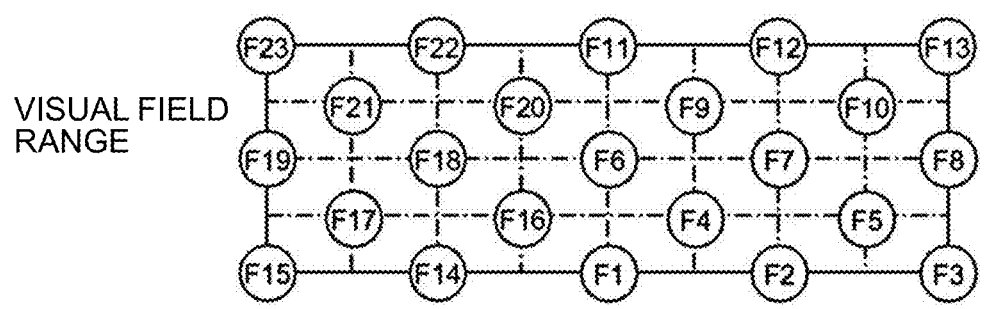

FIG. 19
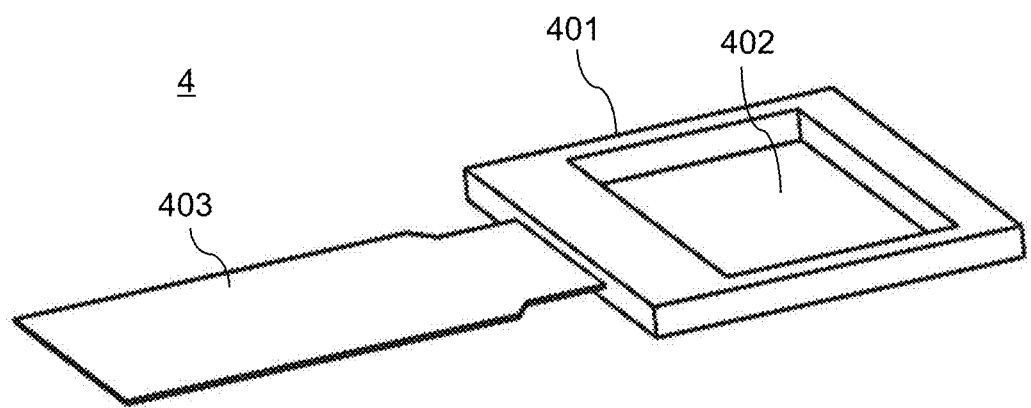
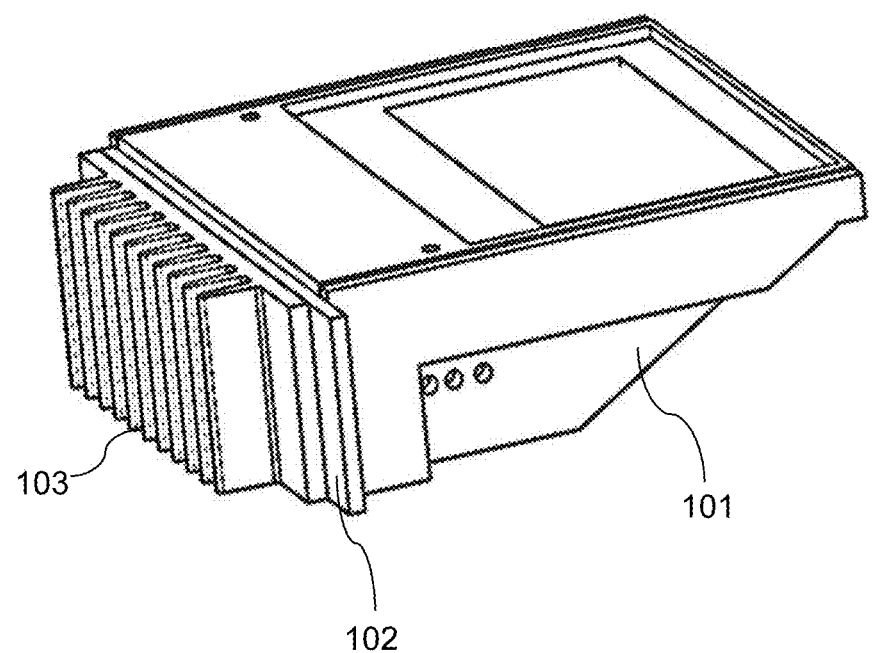

FIG. 26
(a)
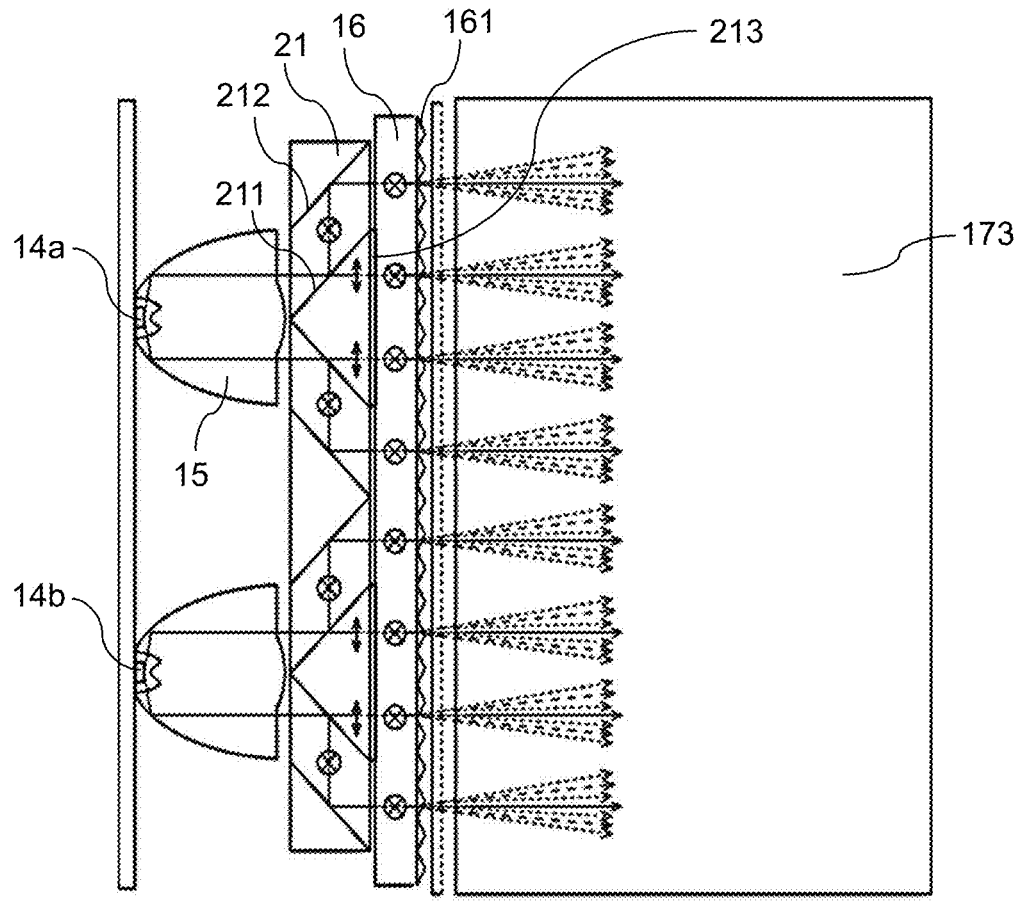
(b)
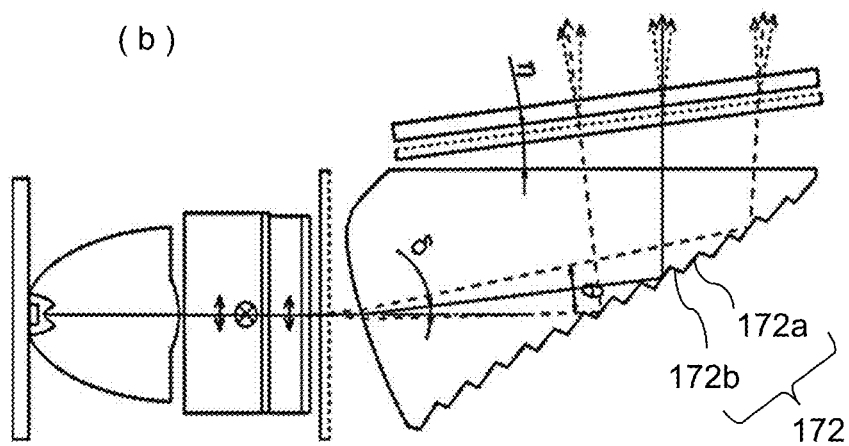

INFORMATION DISPLAY DEVICE

CROSS-REFERENCE TO RELATED APPLICATIONS

The present application is based on PCT filing PCT/JP2021/012419, filed Mar. 24, 2021, which claims priority to JP 2020-067148, filed Apr. 3, 2020, the entire contents of each are incorporated herein by reference.

TECHNICAL FIELD

The present invention relates to an information display device that projects an image on a front glass or a combiner of a vehicle, particularly to an information display device using a projection optical system that allows the image to be viewed as a virtual image through the front glass.

BACKGROUND ART

A so-called head-up display device has been known which projects image light on a front glass or a combiner of a vehicle such as an automobile, a train, or an aircraft to form a virtual image, and which displays traffic information such as route information or traffic congestion information or vehicle information such as remaining fuel amount or coolant temperature. In this type of information display device, it is desirable that a region where a driver can view the virtual image is expanded, whereas high resolution and high visibility of the virtual image are also important performance factors.

The head-up display device provides the driver with an image displayed on an image display device, as an enlarged virtual image using an optical system including a concave surface mirror (action of a convex lens), and the front glass or the combiner is indispensable as a final reflective surface. In addition, in many cases, a liquid crystal display is used as the image display device since the liquid crystal display easily provides a high-definition image and is inexpensive.

In this regard, a head-up display device disclosed in Patent Document 1 includes a device that displays an image, and a projection optical system that projects the image displayed on the display device, a first mirror and a second mirror are provided in an optical path from the display device to an observer, as the projection optical system, and a relationship between an incident angle on the first mirror in an image major-axis direction and an incident angle on the first mirror in an image minor-axis direction, an interval between an image display surface of the display device and the first mirror, and a width of a virtual image in a horizontal direction visually recognized by the observer satisfies a predetermined condition.

In addition, in a head-up display device disclosed in Patent Document 2, in order to reduce a concern of damage to a liquid crystal display panel caused by sunlight, a transmissive and reflective member (hot mirror) that allows display light from the liquid crystal display panel to pass therethrough and that reflects infrared rays is provided to be separated from a front side of the liquid crystal display panel in a non-parallel state.

CITATION LIST

Patent Document

Patent Document 1: JP 2015-194707 A
Patent Document 2: JP 2007-065011 A

SUMMARY OF THE INVENTION

Problems to be Solved by the Invention

As described in Patent Document 1, in the future, it is considered that a method of using a front glass as a reflective surface will become mainstream, but obtaining an image with high visibility in the daytime, particularly in fine weather is required. Further, sunlight that transmits through the front glass and that is condensed by a concave surface mirror under a predetermined condition in the daytime causes so-called burning (carbonization) that a polarizing plate or a liquid crystal panel provided on a light-emitting side of a liquid crystal display device is altered by heat and a light ray intensity of the condensed sunlight, and does not function normally, which is a concern. Namely, under the adoption of technical means for providing high contrast and under the predetermined condition in the daytime, there is a new problem that sunlight passes through the front glass, is condensed by the concave surface mirror, and damages the liquid crystal panel and the polarizing plate, and performance greatly decreases.

Similarly, even in a configuration that the final reflective surface is a combiner, under a predetermined condition, sunlight passes through the front glass and through the combiner, is condensed by the concave surface mirror, and damages the liquid crystal panel and the polarizing plate, and performance greatly decreases.

In addition, in the example of the head-up display device disclosed in Patent Document 1, the display that displays an image, and the projection optical system that projects the image displayed on the display device are provided, the first mirror and the second mirror are provided in the optical path from the display device to the observer, as the projection optical system, and an optical element is not disposed between the concave surface mirror and the liquid crystal panel that is an image display device. For this reason, in addition to the above-described problem, there arises a new problem that light which passes through the front glass, is condensed by the concave surface mirror, and is reflected by a surface of the optical element disposed between the liquid crystal panel and the concave surface mirror returns to the eyes of the driver, and is superimposed on a virtual image obtained by the image display device, so that the definition of an image visually recognized by the driver, particularly contrast performance and apparent resolution greatly decrease.

On the other hand, according to Patent Document 2, in order to reduce a concern of damage to the liquid crystal display panel caused by sunlight, it has been proposed that the transmissive and reflective member (hot mirror) for selectively reflecting infrared rays of sunlight is disposed on the optical path. However, intruding sunlight contains not only infrared rays but also light rays in a visible region or in an ultraviolet region, and in order to reduce damage to the liquid crystal display and to the polarizing plate caused by sunlight, reflecting only light rays in an infrared region is not sufficient. Further, as an adverse influence by the intrusion of external light including visible light, there arises a new problem that the definition of an image visually recognized by the driver, particularly contrast performance and apparent resolution greatly decrease.

As described above, in many cases, the liquid crystal display is used as an image display device used in the head-up display device. However, there are two new problems that contrast performance of the liquid crystal display is low for use as an image source of the head-up display device that superimposes an image on an outside landscape, and under a predetermined condition in the daytime, sunlight passes through the front glass, is condensed by a concave surface mirror, and damages a liquid crystal panel and the polarizing plate, and performance thereof greatly decreases.

Further, it also becomes clear that due to surface reflection of the optical element disposed between the concave surface mirror and the image display device to reduce the size of the head-up display device, some of sunlight returns to a viewpoint (eyes) of the driver, and is superimposed on a virtual image obtained by the image display device, so that the definition of an image visually recognized by the driver, particularly contrast performance and apparent resolution greatly decrease.

The present invention relates to technical means for minimizing an influence on image forming performance of an optical system including a concave surface mirror, as technical means for solving the above-described two problems in the case of using a liquid crystal display as an image source of a head-up display device, and for reducing damage to the liquid crystal display and to a polarizing plate caused by sunlight, while providing high contrast.

The present invention is conceived in view of the problems in the related art described above, and more specifically, an object of the present invention is to provide an information display device that reduces energy of light to be incident on an image display device by mainly reflecting not only an infrared component of sunlight but also a P-polarized light component of light of a wide range of wavelength, and as a result, that also reduces an adverse influence on a liquid crystal display and on a polarizing plate.

In addition, an object of the present invention is to provide an information display device that blocks only a specific polarized light to solve a problem that in the daytime or at night, external light having high intensity at a specific incident angle is reflected by a surface of an optical element disposed between an image display device and a concave surface mirror forming the information display device, returns to eyes of a driver, and is superimposed on a virtual image obtained by the image display device, so that the definition of an image virtually recognized by the driver, particularly contrast performance and apparent resolution greatly decrease.

Solutions to Problems

In order to achieve the above-described object, as one example of the present invention, there is provided an information display device that displays image information as a virtual image on a projection surface, the device including: inside a housing including an opening portion at a part of the housing, image light generating means for generating image light for displaying the image information; image light processing means for performing a predetermined optical process on the image light from the image light generating means; and image projecting means for projecting the image light from the image light processing means on the projection surface through the opening portion of the housing such that a viewer can recognize the image information as the virtual image in front of the projection surface. An optical element in which a reflective polarizing plate is fixed to a substrate having a transmissive property with an adhesive agent or with a pressure-sensitive adhesive agent is provided in a part of an optical path inside the housing, as means for selectively reflecting a P-polarized light component of light in a visible light region, and a moisture-proof film is provided on a surface of the reflective polarizing plate.

Effects of the Invention

According to the present invention, while realizing a reduction in the size of the device, it is possible to correct a distortion or an aberration of a virtual image to be viewed by a driver, and at the same time, it is possible to reduce a decrease in performance resulting from damage to a liquid crystal panel that is an image display device or to a polarizing plate or the like caused by external light including sunlight (mostly P-polarized light component) to be incident through a front glass that is condensed by a concave surface mirror forming a virtual image optical system. Namely, it is possible to provide the information display device that reduces an adverse influence caused by light of a wide range of wavelength contained in external light including sunlight, that improves contrast performance, and that forms a virtual image having high resistance to outside air and having good reliability.

BRIEF DESCRIPTION OF THE DRAWINGS

FIG. 7 is a table showing a specific example of lens data of an optical system.

FIG. 8 is a table showing free-form surface coefficients for mirror surfaces.

FIG. 9 is a schematic configuration view showing the entire optical system.

FIG. 11 is a view showing a distortion amount of the optical system.

FIG. 12 is a view showing image forming performance (spot image) of the optical system.

FIG. 19 is a configuration view showing the disposition of an image display device and a light source device.

FIG. 26 is an enlarged view of the light guide body light reflective portion (surface).

MODE FOR CARRYING OUT THE INVENTION

Hereinafter, an embodiment of the present invention will be described in detail with reference to the drawings and the like. Incidentally, the present invention is not limited to the following description, and various changes and modifications can be made by those skilled in the art within the technical concept disclosed in this specification. In addition, in all the drawings for describing the present invention, elements having the same functions are denoted by the same reference signs, and repeated descriptions thereof may be omitted.

<Overview of Information Display Device>

Figure 1:
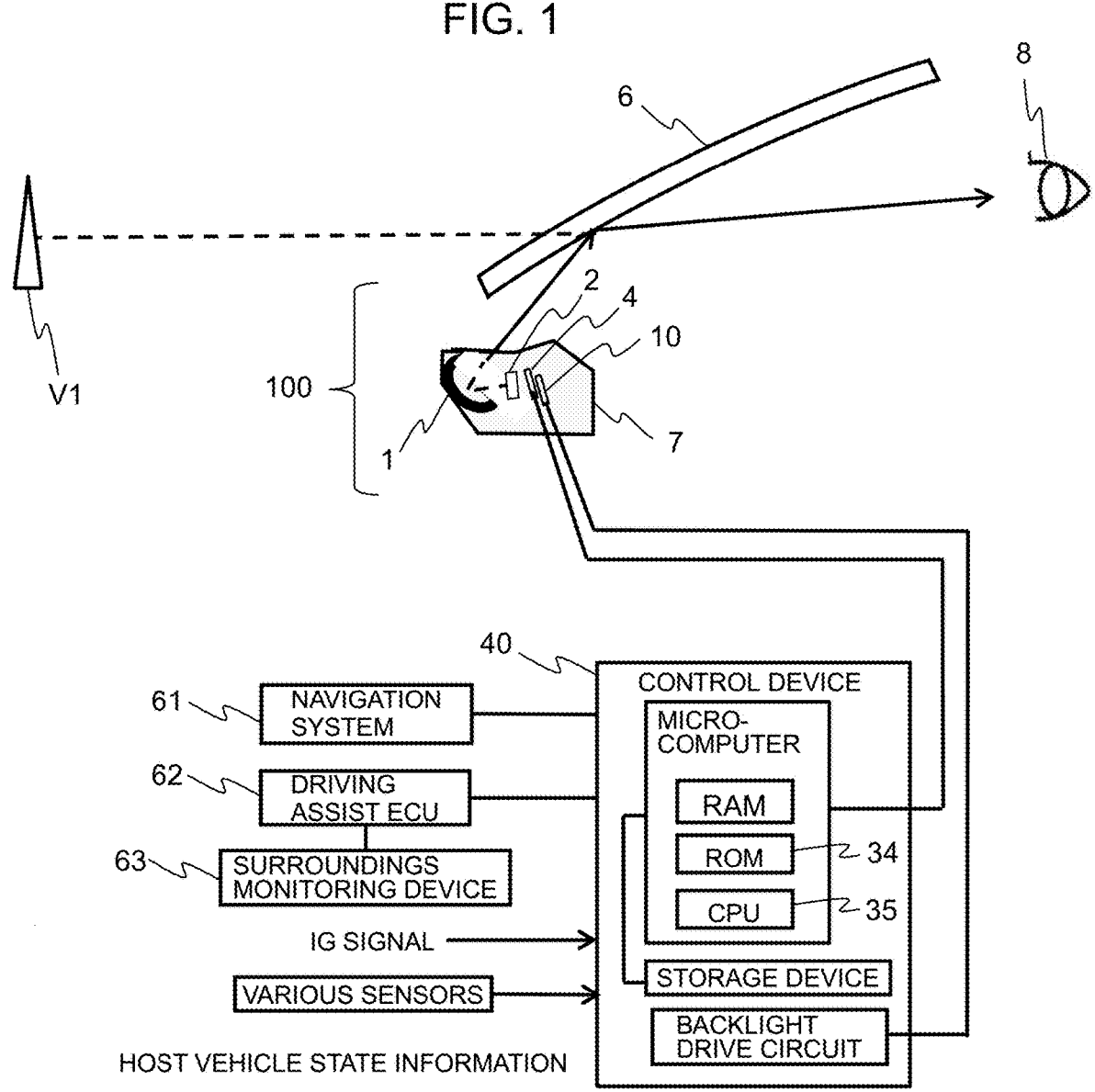
FIG. 1 is a schematic configuration diagram including a configuration of peripheral devices of an information display device.

FIG. 1 is a schematic configuration view showing a configuration of peripheral devices of an information display device according to one embodiment of the present invention. Here, as one example, an information display device 100 that projects an image on a front glass (also called a windshield) of an automobile will be described.

As shown in FIG. 1, the information display device 100 is a device that displays various information reflected by a projected member 6 (in the present embodiment, an inner surface of the front glass), as a virtual image VI such that the virtual image VI is formed in front of a host vehicle at a viewpoint (eyepoint) 8 of a driver (viewer), a so-called head-up display device. Incidentally, the projected member 6 may be any member on which information is projected, and may be a combiner (not shown) without being limited to the above-described front glass. Namely, the information display device 100 forms a virtual image in front of the host vehicle at the viewpoint 8 of the driver and allows the driver to visually recognize the virtual image, and information to be displayed as the virtual image also includes, for example, vehicle information or foreground information captured by a camera such as a monitoring camera or an around viewer.

The information display device 100 includes, inside a housing 7, a light source device 10; an image display device 4 that projects image light for displaying information; a concave surface (free-form surface) mirror 1 that reflects an image displayed on the image display device 4, toward the projected member 6; a lens element 2 for correction that corrects a distortion or an aberration occurring when a virtual image is formed by the concave surface mirror 1; and an optical element (not shown) disposed between the lens element 2 for correction and the image display device 4 to prevent sunlight from being condensed by the concave surface mirror 1 and from returning to the image display device 4.

Furthermore, the information display device 100 includes a control device 40 that controls the image display device 4 and that drives the light source device 10 (backlight). Incidentally, optical components including the image display device 4, the light source device 10, and the like form a virtual image optical system, and include the concave surface mirror 1 that reflects light. The light reflected by this optical component is reflected by the projected member 6 and travels toward the viewpoint 8 of the driver. Examples of the image display device 4 include a self-luminous vacuum fluorescent display (VFD) and the like in addition to a liquid crystal display (LCD) including a backlight.

On the other hand, instead of the image display device 4 described above, an image may be displayed on a screen by a projection device, converted into a virtual image by the concave surface mirror 1, and reflected toward the viewpoint 8 of the driver by the front glass or the combiner that the projected member 6. Such a screen may be formed of, for example, a microlens array in which microlenses are two-dimensionally disposed.

Here, in order to reduce distortion of a virtual image, the concave surface mirror 1 is shaped such that a curvature radius is relatively small at an upper part shown in FIG. 1 (region where light rays are reflected under the front glass 6 and to which a distance from the viewpoint 8 of the driver is relatively short) so as to increase a magnification ratio. On the other hand, it is favorable that the concave surface mirror 1 is shaped such that a curvature radius is relatively large at a lower part (region where light rays are reflected above the front glass 6 and to which a distance from the viewpoint 8 of the driver is relatively long) so as to reduce a magnification ratio. In addition, the image display device 4 is inclined with respect to an optical axis of the concave surface mirror 1 to correct the above-described difference in the magnification of a virtual image and to reduce an occurring distortion itself, so that better correction can be realized.

Figure 2:
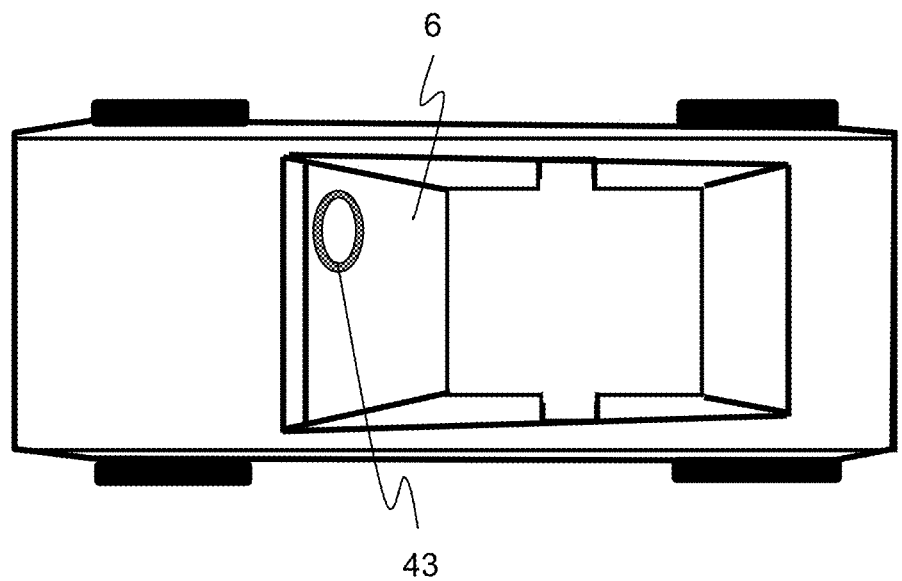
FIG. 2 is a top view of a passenger vehicle in which the information display device is mounted.
Figure 3:
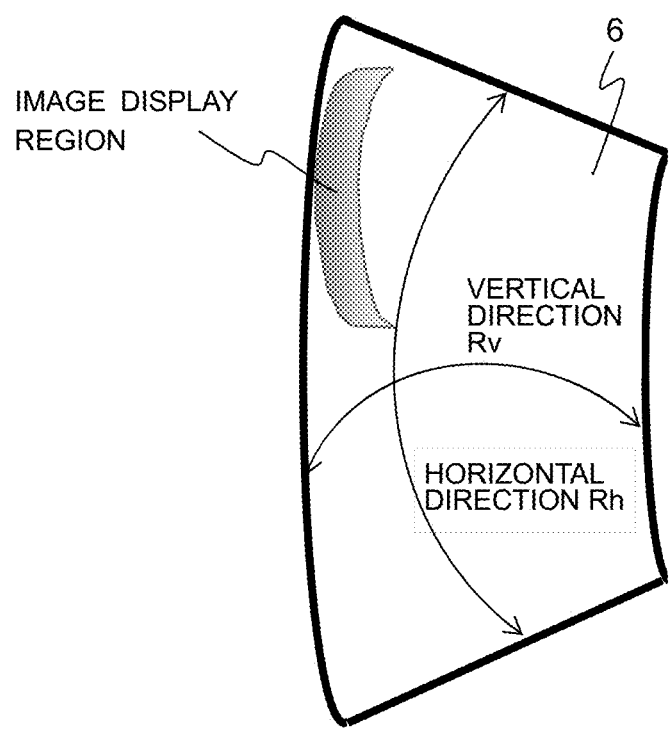
FIG. 3 is a view for describing a difference in the curvature radius of a front glass.

On the other hand, as shown in FIGS. 2 and 3, in the front glass 6 for a passenger vehicle, a curvature radius Rv in a vertical direction of a glass body and a curvature radius Rh in a horizontal direction are different from each other, and generally, have a relationship of Rh>Rv. For this reason, when the front glass 6 is used as a reflective surface, the front glass 6 becomes a toroidal surface of the concave surface mirror 1. For this reason, in the information display device 100 of the present embodiment, it is favorable that the shape of the concave surface mirror 1 has different average curvature radii in the horizontal direction and in the vertical direction so as to correct a difference in the magnification of a virtual image caused by the shape of the front glass 6, namely, so as to correct a difference between the curvature radii of the front glass 6 in the vertical direction and the horizontal direction. In this case, when the shape of the concave surface mirror 1 is a spherical surface or an aspherical surface that is symmetric with respect to the optical axis (represented by the following Equation 2), the shape of the concave surface mirror 1 is a function of a distance r from the optical axis, and a horizontal cross-sectional shape and a vertical cross-sectional shape at a distant location cannot be individually controlled. Therefore, it is preferable that a free-form surface shape represented by the following Equation 1 is corrected as a function of surface coordinates (x, y) from the optical axis of a mirror surface.

[Equation 1]

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n) \quad (1)$$

[Equation 2]

$$z = \frac{c \cdot h^2}{1 + \sqrt{1 - (1+K)c^2 \cdot h^2}} + A \times h^4 + B \times h^6 + C \times h^8 + \\ D \times h^{10} + E \times h^{12} + F \times h^{14} + G \times h^{16} + H \times h^{18} + J \times h^{20} \quad (2)$$

Returning to FIG. 1, as a transmissive optical component, the lens element 2 is further disposed between the image display device 4 and the concave surface mirror 1 to control an emitting direction of light rays to the concave surface mirror 1. Accordingly, a distortion aberration is corrected according to the shape of the concave surface mirror 1, and at the same time, the aberration correction of a virtual image including an astigmatism caused by the above-described difference between the curvature radius in the horizontal direction of the front glass 6 and the curvature radius in the vertical direction is realized.

In addition, in order to further enhance the aberration correction capability, the lens element 2 described above may be formed of a plurality of lenses. Alternatively, the distortion aberration can also be reduced by disposing a curved (free-form surface) mirror instead of the lens element 2, and by controlling incident positions of light rays on the concave surface mirror 1 at the same time as turning back an optical path. Further, an optical element that is optimally designed to improve the aberration correction capability may be provided between the concave surface mirror 1 and the image display device 4. In addition, in addition to the original aberration correction, a display position of a virtual image is continuously changed from a distant position to a close position by changing an optical distance between the concave surface mirror 1 and the image display device 4 through changing a thickness of the lens element 2 described above in an optical axis direction.

In addition, a difference in the magnification of a virtual image in an up-down direction may be corrected by disposing the image display device 4 to be inclined with respect to a normal line to the optical axis of the concave surface mirror 1. Further, an optical element (not shown here) that reflects or absorbs a P-polarized light in a visible light region of and light in an ultraviolet light region and in an infrared light region of sunlight that passes through the front glass 6 and that is condensed by the concave surface mirror 1 may also be provided between the concave surface mirror 1 and the image display device 4 to reduce the amount of light returning to the image display device 4.

On the other hand, as a factor that decreases image quality of the information display device 100, it is known that image light rays emitted from the image display device 4 toward the concave surface mirror 1 are reflected by a surface of the lens element 2 disposed in the middle to return to the image display device 4, and are reflected again to be superimposed on the original image light, thereby decreasing the image quality. For this reason, in the present embodiment, an anti-reflection film is formed on the surface of the lens element 2 to suppress reflection. Further, a lens surface shape of one or both of an image light-incident surface and an image light-emitting surface of the lens element 2 has restrictions such that the lens surface has a shape in which the above-described reflected light is not condensed on a portion of the image display device 4 (for example, a shape in which a concave surface faces the image display device 4).

Further, the inventors of this application and others have studied characteristics of the anti-reflection film provided on the surface of the lens element 2. As a result, it has been confirmed by experiments that a reflectance of a green wavelength region where a luminosity factor is at its highest, a reflectance of a red wavelength region, and a reflectance of a blue wavelength region are suppressed to 0.2% or less, to 0.6% or less, and to 1.0% or less, respectively, so that even when sunlight is reflected by the surface of the optical element, the image quality of a virtual image is not affected.

In addition, regarding the image display device 4, in order to absorb the reflected light from the lens element 2 described above, a second polarizing plate is disposed to be separated from the liquid crystal panel in addition to a first polarizing plate disposed close to a liquid crystal panel. Then, since the light source device of the present embodiment to be described later that generates polarized light in a specific direction is used, the degree of polarization can be increased by approximately 10 times, and contrast performance can be greatly improved compared to the case of two polarizing plates attached to a normal liquid crystal image display. Further, when sunlight that has passed through the front glass 6 is condensed by the concave surface mirror 1 and is incident on the liquid crystal panel, the sunlight is absorbed or reflected by the first and second polarizing plates, and the amount of the sunlight is reduced, so that reliability of the liquid crystal panel can be improved.

Figure 4:
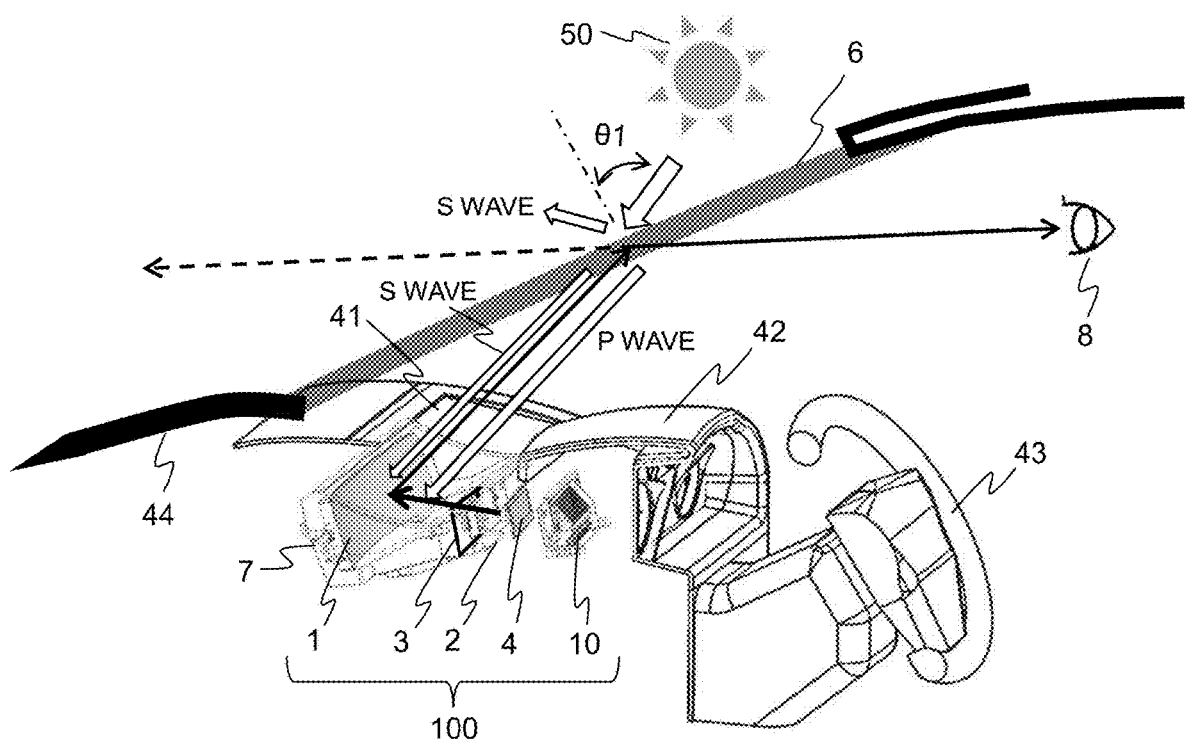
FIG. 4 is a view showing a relationship between the information display device and a position of a viewpoint of a driver.

On the other hand, as shown in FIG. 4, an optical element 3 (also called optical means) having a function of reflecting a P-polarized light component is disposed between the lens element 2 and the concave surface mirror 1 described above. The optical element 3 is disposed to be inclined with respect to an optical axis established by the concave surface mirror 1 and the image display device 4. Accordingly, the P-polarized light component of the sunlight incident from the front glass 6 is reflected and condensed at a position away from the concave surface mirror 1, so that the reflected light does not return to the eyepoint 8 of the driver, thereby not interfering with the driving of the automobile.

Since the image display device 4 modulates luminance of light from the light source from which only a specific polarized light is obtained, according to an image signal from the liquid crystal display, the resulting image light is S-polarized light. Since the optical element 3 (reflective polarizing plate) described above also acts to transmit S-polarized image light and to improve the degree of polarization, it has been found that there is also an advantage of improving contrast performance of an image viewed by the driver. In addition, since light of the image light totally reflected by the surface of the lens element 2 is changed from S-polarized light to P-polarized light, the light is reflected by the optical element 3 described above, and does not adversely affect the image viewed by the driver.

Next, regarding the image display device 4, in order to absorb the reflected light from the lens element 2 described above, when the second polarizing plate is disposed to be separated from the liquid crystal panel in addition to the first polarizing plate disposed close to the liquid crystal panel, a decrease in image quality can be reduced. In addition, the backlight of the liquid crystal panel, in other words, an incident direction of the light to be incident on the liquid crystal panel is controlled such that the image light is efficiently incident on an entrance pupil of the concave surface mirror 1. In this case, when a divergence angle of light fluxes to be incident on the liquid crystal panel is reduced, not only can the image light be efficiently directed toward the eyepoint of the driver, but an image with high visibility and with high contrast can be obtained. The contrast performance of an image with respect to the divergence angle is more remarkable in the horizontal direction, and when the divergence angle is in a range of ±20 degrees, good characteristics are obtained. Further, in order to improve the contrast performance, it is favorable that light fluxes having a divergence angle of ±10 degrees are be used.

On the other hand, it is preferable that a solid-state light source with a long product life is employed as the light source device 10. Particularly, it is preferable that a light emitting diode (LED) in which a change in light output with respect to fluctuation in ambient temperature is small and a polarizing beam splitter (PBS) provided with optical means for reducing a divergence angle of light are used to perform polarization conversion.

Polarizing plates (not shown here) are disposed on a backlight side (light-incident surface) and a lens element 2 side (light-emitting surface) of the liquid crystal panel, and accordingly, a contrast ratio of the image light is increased. An iodine-based polarizing plate with a high degree of polarization is employed as the polarizing plate provided on the backlight side (light-incident surface), so that a high contrast ratio is obtained. On the other hand, a dye-based polarizing plate is used on the lens element 2 side (light-emitting surface), so that even when external light is incident or the environmental temperature is high, high reliability can be obtained.

When a liquid crystal panel is used as the image display device 4, particularly, when the driver wears polarized sunglasses, a specific polarized light is blocked and an image cannot be seen, which is a problem. In order to prevent this problem, it is preferable that a λ/4 plate is disposed on an optical element side of the polarizing plate disposed on the lens element 2 side of the liquid crystal panel, to convert image light aligned in a specific polarization direction, into circularly polarized light, or to set a polarization axis different from a polarization direction of the polarized sunglasses.

Returning to FIG. 1, portions other than image projection will be described. The control device 40 acquires various information such as a speed limit of or the number of lanes of a road corresponding to a current position where the host vehicle travels, and a planned moving route of the host vehicle set in a navigation system 61, from the navigation system 61 as foreground information (namely, information displayed in front of the host vehicle by the virtual image).

A driving assist electronic control unit (ECU) 62 is a driving assist control device that controls a drive system or a control system in accordance with an obstacle detected as a result of monitoring by a surroundings monitoring device 63. The driving assist control includes, for example, known techniques such as cruise control, adaptive cruise control, pre-crash safety, and lane keeping assist.

The surroundings monitoring device 63 is a device that monitors situations around the host vehicle. As one example, the surroundings monitoring device 63 is a camera that detects objects existing around the host vehicle based on a captured image of the surroundings of the host vehicle, a survey device that detects objects existing around the host vehicle based on a result of transmitting and receiving survey waves, or the like.

The control device 40 acquires information (for example, a distance to a preceding vehicle and a direction of a preceding vehicle, a position where an obstacle or a sign exists, and the like) from the driving assist ECU 62 as foreground information. Further, an ignition (IG) signal and host vehicle state information are input to the control device 40. When the ignition signal is input to the control device 40, the control device 40 starts up. The host vehicle state information is vehicle information acquired by various sensors, and includes, for example, warning information indicating that an abnormal state defined in advance has occurred, such as a remaining fuel amount of or coolant temperature of an internal combustion engine. In addition, an operation result of a direction indicator, a traveling speed of the host vehicle, shift position information, and the like are included. The configuration of the entire system including the information display device 100 of the present embodiment has been described above.

<Intrusion of Sunlight into Device and Intrusion Suppression Principle>

Next, the intrusion of sunlight into the information display device in a driver's seat of the vehicle will be described.

FIG. 4 shows a state of the vicinity of the driver's seat of the vehicle. The information display device 100 is disposed under the front glass 6 attached between a bonnet 44 forming a vehicle body and a ceiling panel 45, for example, on a back side of a dashboard 42 (bonnet rear side) including instruments such as a speedometer. In addition, this drawing shows sun 50 in the daytime above the vehicle, together with a steering wheel 43 of the vehicle and the viewpoint 8 of the driver. In addition, FIG. 5 particularly shows a relationship between the sun 50, the front glass 6, and the viewpoint 8 of the driver in the state of FIG. 4.

Figure 5:
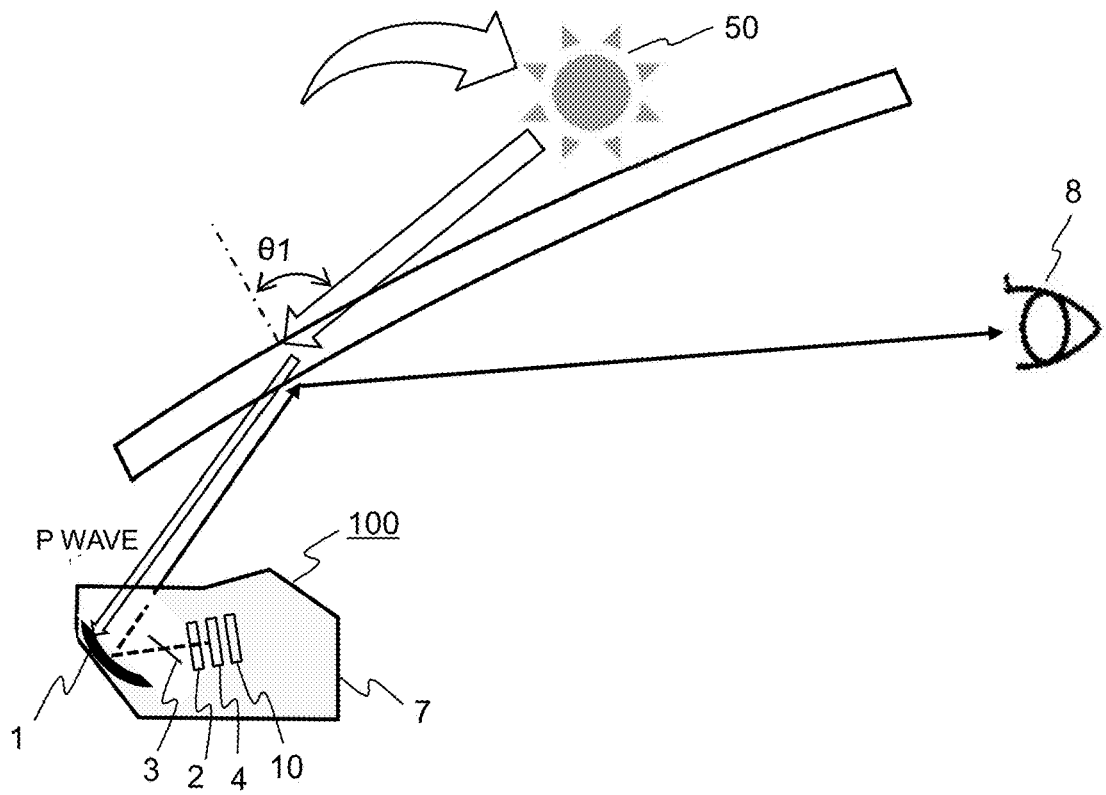
FIG. 5 is a view showing a relationship between sunlight, the front glass, and the viewpoint of the driver.

In FIGS. 4 and 5, as indicated by solid arrows, image light emitted from the information display device 100 is reflected by the front glass 6 or by the combiner (not shown), and is incident on the viewpoint 8 of the viewer.

Figure 6:
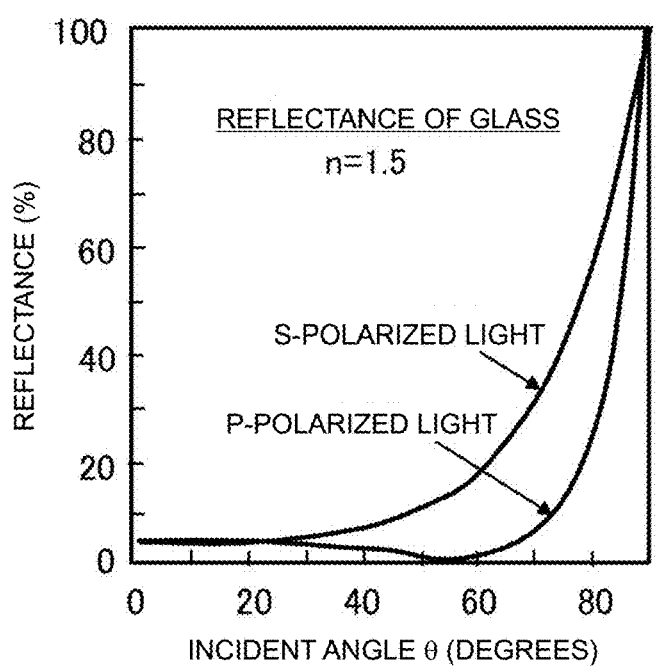
FIG. 6 is a graph for describing a reflectance of glass for S-polarized light and for P-polarized light.

On the other hand, as indicated by white arrows, strong light from the sun 50 is incident on the front glass 6 of the vehicle at an incident angle θ, some of the strong light is reflected by the front glass 6, and then remaining light intrudes into the information display device 100 through an opening portion 41 provided in an upper portion of the information display device 100. Here, natural light such as sunlight exists in a state where P-polarized light and S-polarized light are mixed. In this case, particularly, when the incident angle θ is 50 degrees or more, most of an S-polarized light component (S wave) of the sunlight is reflected on the front glass 6. As a result, most of the sunlight intruding into the information display device 100 is a P-polarized light component (P wave). The reason for this is that a reflectance of the glass shows incident angle dependency as shown in FIG. 6. Namely, the reason is that in a region where the incident angle θ with respect to the front glass 6 is more than 50 degrees, the reflectance on the glass surface differs between S-polarized light and P-polarized light, and a reflectance for the S-polarized light is larger than a reflectance for the P-polarized light.

The present embodiment is based on the above-described findings obtained by the inventors of this application and others, and takes into consideration that most of sunlight intruding through the front glass 6 is the P-polarized light component. Namely, the present embodiment is based on the finding that in order to suppress external light including sunlight intruding into the information display device 100, particularly, reducing a P-polarized light component is effective, and using an S-polarized light component as image light to be projected from the information display device 100 is effective.

<Specific Embodiment of Optical System of Information Display Device>

FIG. 7 shows a specific example of lens data of an optical system forming the information display device 100. In the lens data, a curvature radius is indicated by a positive sign when a center position of the curvature radius is in a traveling direction, and an inter-surface distance represents a distance on an optical axis from an apex position of each surface to an apex position of a next surface. Incidentally, in a reflective optical system, the sign of the curvature radius is reversed at a location where the inter-surface distance is a negative value.

Eccentricity refers to a value in each of an X-axis direction, a Y-axis direction, and a Z-axis direction, slant refers to rotation around an X-axis, to rotation around a Y-axis, and to rotation around a Z-axis, eccentricity/slant act on a corresponding surface in order of eccentricity and slant, and in "general eccentricity", a next surface is disposed at a position of an inter-surface distance on a new coordinate system on which eccentricity/slant act. Eccentricity and slant of decenter-and-return act only on the surface and do not affect a next surface. Incidentally, clockwise rotation around the X axis is positive when viewed in a positive direction of the X axis, clockwise rotation around the Y axis is positive when viewed in a positive direction of the Y axis, and counterclockwise rotation around the Z axis is positive when viewed in a positive direction of the Z axis.

Glass material name "50.30" represents a material having a refractive index of 1.50 and an Abbe number of 30, and glass material name "52.649" represents a material having a refractive index of 1.52 and an Abbe number of 60. In the present embodiment, the concave surface mirror and a return mirror are formed into a free-form surface shape to secure telecentricity, and to realize good distortion performance and spot diagram as will be described later.

FIG. 8 shows free-form surface coefficients for mirror surfaces in the lens data of FIG. 7. Here, the free-form surface coefficient is obtained by Equation 1.

[Equation 3]

$$Z = \frac{c \cdot (x^2 + y^2)}{1 + \sqrt{1 - (1+K)c^2 \cdot (x^2 + y^2)}} + \sum\sum (Cj(m, n) \times x^m \times y^n) \quad (1)$$

A free-form surface coefficient Cj corresponds to a shape that is rotationally asymmetric with respect to each optical axis (Z-axis), and to a shape defined by a component of a cone term and a component of a term of the polynomial of X and Y. For example, when X is in the second order (m=2), and Y is in the third order (n=3), a coefficient of C19 where j={(2+3)2+2+3×3}/2+1=19 corresponds thereto. In addition, a position of an optical axis of each free-form surface is determined by the amount of eccentricity/slant in the lens data of FIG. 7.

Figure 10:
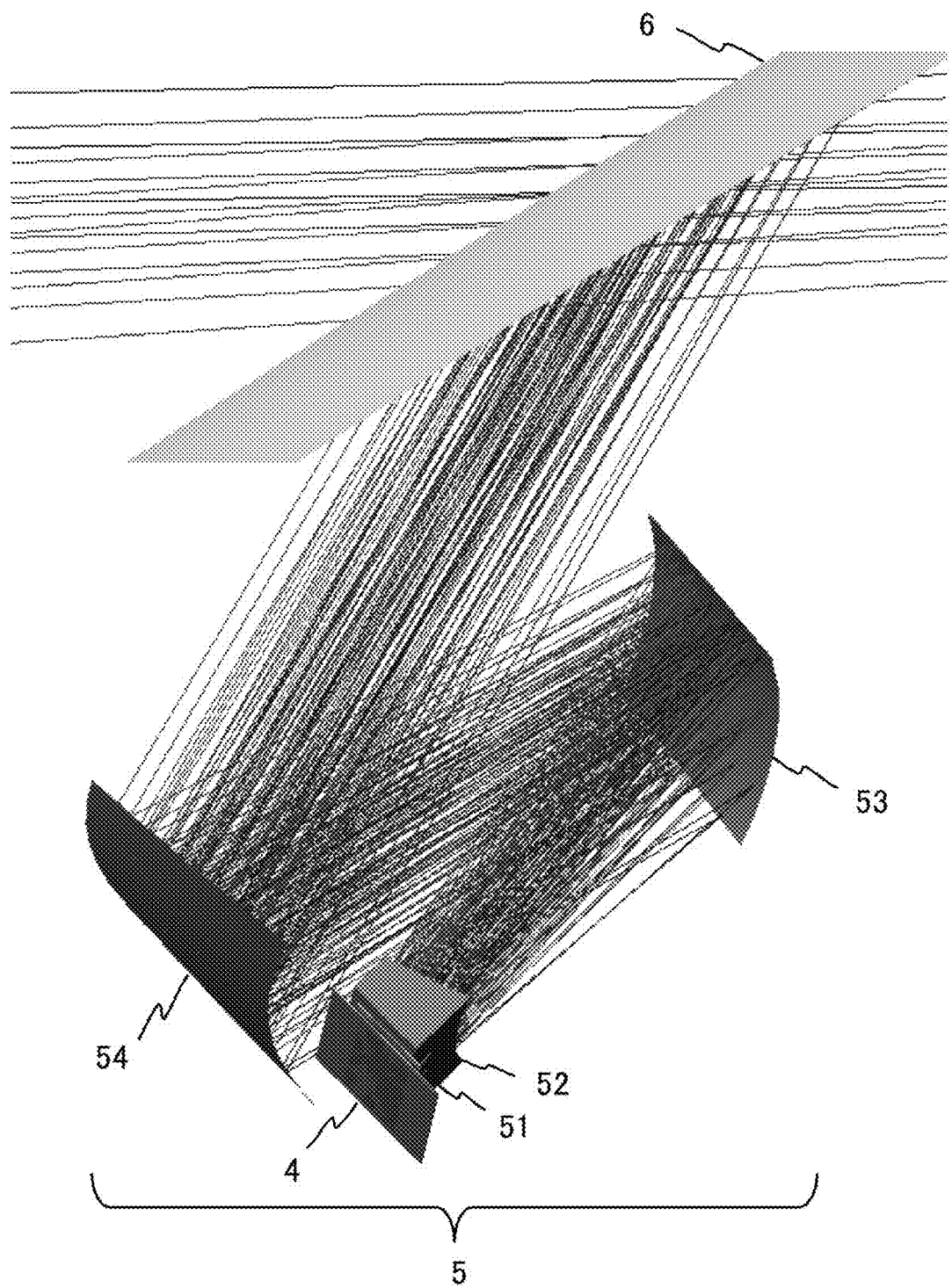
FIG. 10 is a schematic configuration view showing a part of the optical system in an enlarged manner.

FIG. 9 is a view showing the disposition of the entire optical system, and FIGS. 9(a) and 9(b) are views when viewed in the horizontal direction (X-axis direction) and in the vertical direction (Y-axis direction), respectively. Further, FIG. 10 is an enlarged view of a main part thereof. As shown in FIG. 10, an eyepiece optical system 5 is configured by disposing a polarizing unit 51, a concave lens 52, a return mirror 53, and a concave surface mirror 54 with positive refractive power side by side with the front glass 6 from a liquid crystal display panel 4 side. The polarizing unit 51 suppresses the P-polarized light component of sunlight intruding into the device under a specific condition (incident angle), and selects a polarizing plate for protecting the liquid crystal display panel 4. Particularly, in order to reduce damage to the polarizing plate caused by sunlight, it is favorable that a reflective polarizing plate is selected. In the present embodiment, the concave surface mirror 54 and the return mirror 53 are formed into a free-form surface shape to secure telecentricity, and to realize good distortion performance and image forming performance (spot image).

Hereinafter, as specifications of the eyepiece optical system of the present embodiment, values of an eyebox size, a viewing angle, and the like are shown in order of the horizontal direction and the vertical direction.

Eyebox size: 130×40 mm
Effective size of image light on liquid crystal display panel: 68.0×25.2 mm
Virtual image size: 3500×943 mm
Viewing angle (full view angle): 10.0×2.7 degrees
Angle of dip: 2.376 degrees
Virtual image distance: 20.0 m In addition, optical performance of the information display device 100 of the present embodiment will be described. FIG. 11 is a view showing distortion performance of the information display device. A distortion amount at each position inside an eyebox is shown. FIG. 12 shows image forming performance of the information display device using spot images. A spot image for each color at each position within a visual field is shown. As shown by these results, good distortion performance and image forming performance (spot image) can be obtained. Incidentally, in the present embodiment, a lighting optical system is disposed to be inclined with respect to the liquid crystal display panel 4 at an angle of 14 degrees. Therefore, according to the present embodiment, the information display device 100 having a large virtual image distance can be provided by a projection optical system using the concave lens 52 and the concave surface mirror 54.

<Specific Embodiment of Information Display Device>

Subsequently, a more specific configuration of the optical system of the information display device 100 configured based on the above-described findings will be described.

Figure 13:
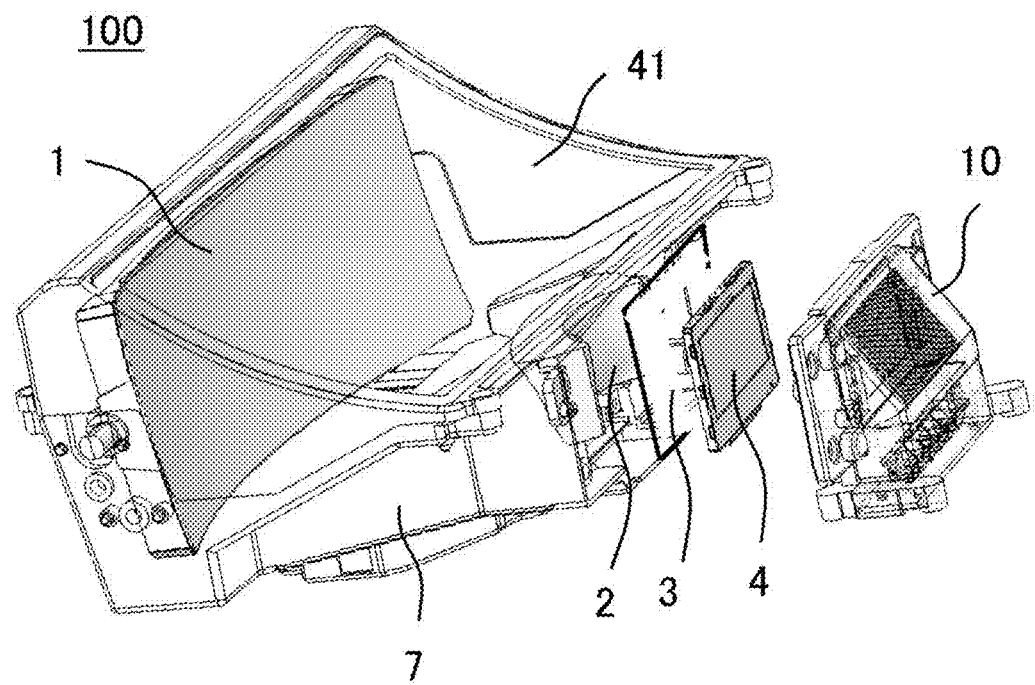
FIG. 13 is an enlarged view showing an overall configuration of the information display device.

FIG. 13 shows an overall configuration of the information display device 100 in an enlarged manner, and as described above, the concave surface mirror 1 that projects image light for forming a virtual image through the front glass 6, the lens element (lens group) 2 for correction that corrects a distortion or an aberration occurring when the virtual image is formed, the optical element 3 that suppresses the P-polarized light component, the image display device 4, and the light source device 10 forming a backlight are provided in order from a downstream side. Incidentally, this configuration shows an example of an optical system with a short optical path that does not require the return mirror 53 (refer to FIG. 10). Here, the optical element 3 is intended to suppress the P-polarized light component of sunlight intruding into the information display device 100, and a reflective polarizing plate is provided between the lens element 2 and the image display device 4. Accordingly, the degree of polarization of the reflective polarizing plate is added in addition to the degree of polarization of the polarizing plates provided on both surfaces on light-incident and -emitting sides of the liquid crystal panel of the image display device 4, a high-contrast image can be obtained. In addition, since the optical element 3 (reflective polarizing plate) is disposed to be inclined with the optical axis of the above-described virtual image optical system, reflected light does not enter the eyes of the driver through the front glass 6, and does not interfere with driving.

First, the concave surface mirror 1 that projects image light has a function of reflecting visible light (wavelength: approximately 400 to 700 nm) and of removing an optical component at the same time that is not wanted by the information display device and that damages the device. For example, the concave surface mirror 1 has a function of removing infrared rays (IR), ultraviolet rays (UV), and the like from sunlight containing various wavelength spectra. At this time, the virtual image optical system with high light use efficiency can be realized by setting a reflectance of the visible light to 95% or more.

Figure 14:
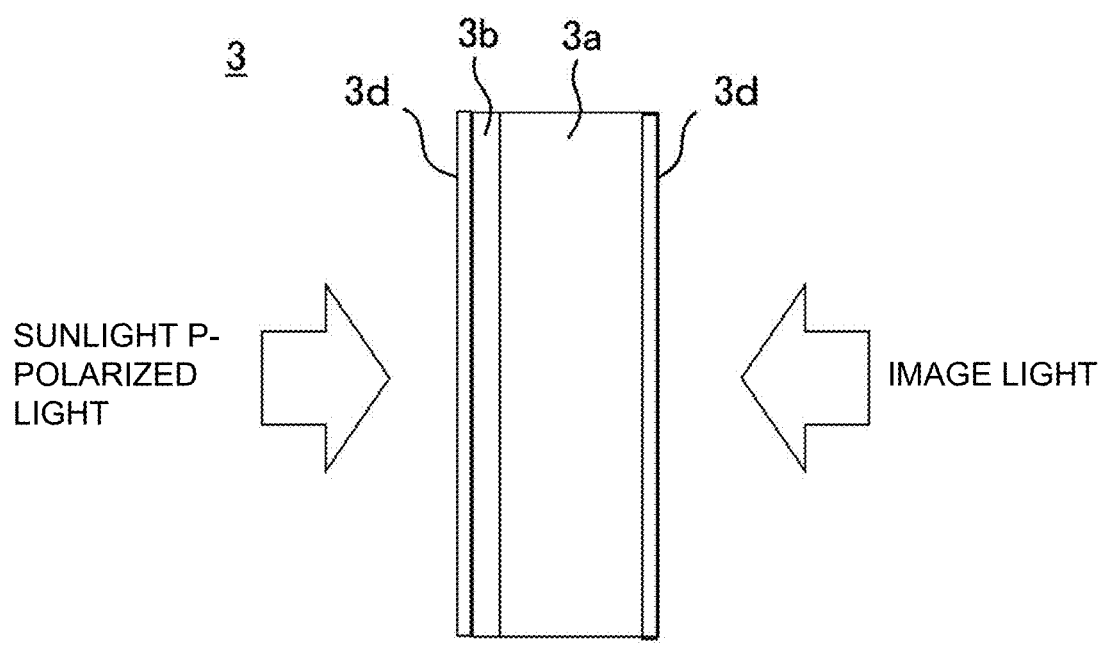
FIG. 14 is a view schematically showing a configuration of an optical element including a reflective polarizing plate.

Next, FIG. 14 is a longitudinal cross-sectional view schematically showing a configuration of a reflective polarizing plate as the optical element 3. A material having high transparency is used for a substrate 3a of the optical element 3 such that the substrate 3a does not absorb light of a wavelength in the visible light region of the above-described sunlight. Furthermore, a reflective polarizing plate 3b is formed on a surface of the substrate 3a.

As a method for obtaining the reflective polarizing plate 3b, there is a method (1) in which an aluminum pattern is formed on a glass substrate of the related art through a film forming process of photolithography. In addition, in recent years, a method (2) is known in which a reflective polarizing plate that is cheaper than that obtained by the method (1) is obtained by forming an aluminum pattern through nanoimprinting. A typical example obtained by the method (2) is a reflective polarizing film WGF (registered trademark) manufactured by Asahi Kasei E-Materials Corporation.

In a reflective polarizing plate manufacturing method of Asahi Kasei E-Materials Corporation, according to the company's technical data, a reflective polarizing plate is obtained by shaping ultraviolet curable resin on a surface of a TAC film through a roll-to-roll process using a nanoimprinting method, and by forming an aluminum film on surfaces thereof (including side surfaces). Similarly to the reflective polarizing plate of the method (1) described above, polarization characteristics (parallel light transmittance and cross transmittance) obtained at this time are uniquely determined by the height and the pitch of formed protrusion portions. Problems and solutions in the case of applying, for example, the above-described reflective polarizing plate WGF (registered trademark) obtained by the method (2) that is inexpensive and that has a large price advantage will be described below with reference to the drawings.

Figure 15:
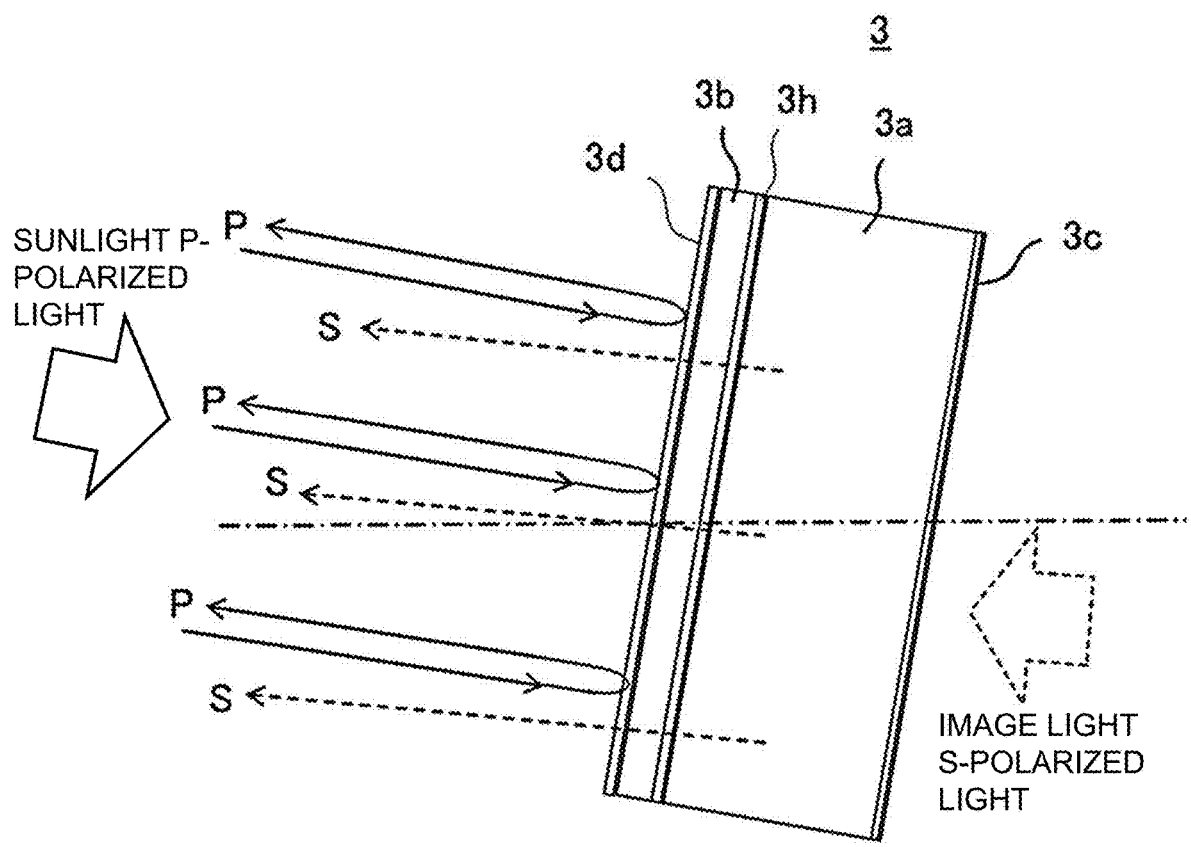
FIG. 15 is a cross-sectional view for describing an action of the reflective polarizing plate.
Figure 16:
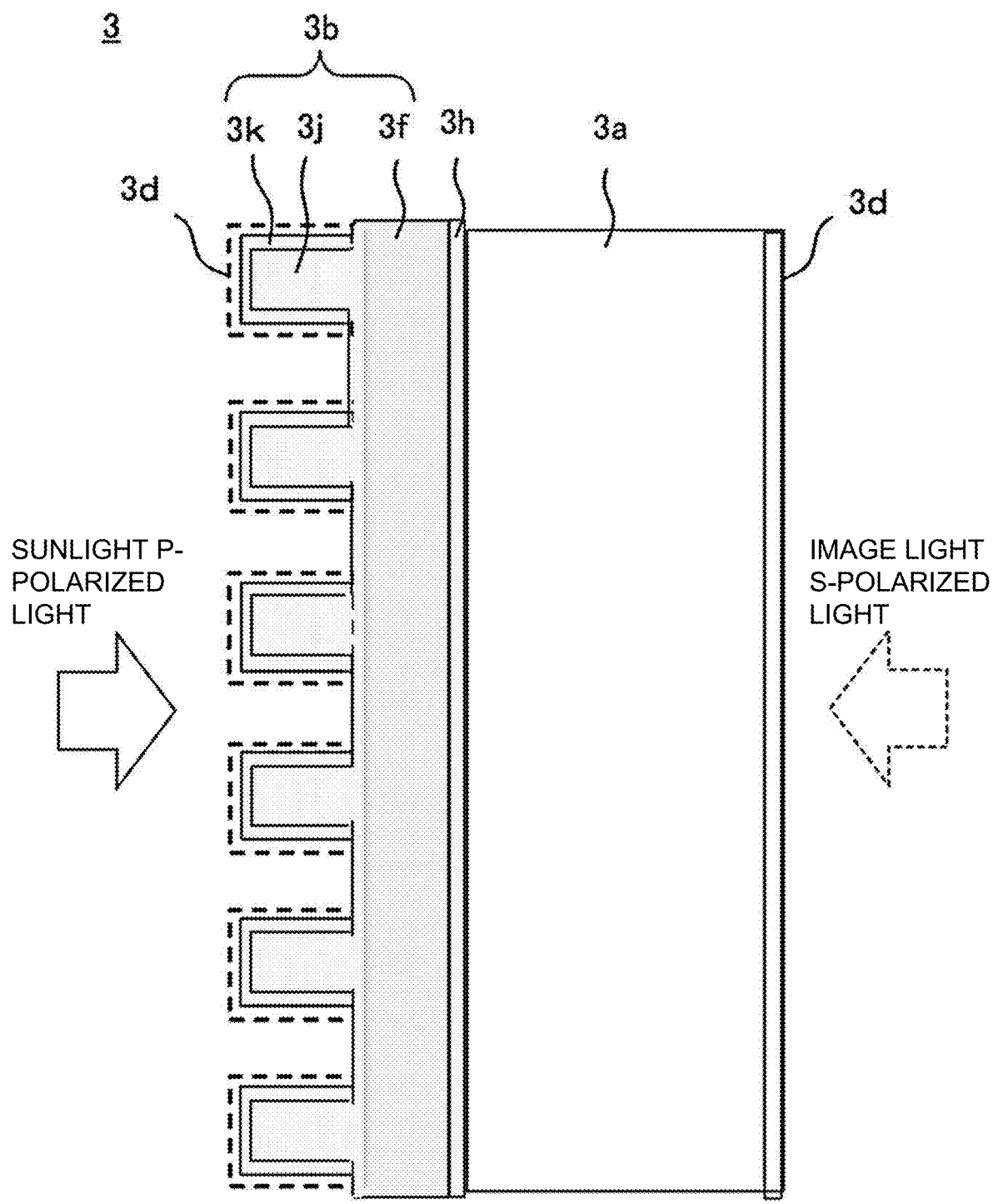
FIG. 16 is a cross-sectional view showing a specific structure of the reflective polarizing plate.

FIGS. 14 to 16 are cross-sectional views showing a configuration of the reflective polarizing plate. As shown in the drawings, in the present embodiment, the reflective polarizing plate 3b is provided on a side on which sunlight is incident. More specifically, the reflective polarizing plate 3b is pressure-sensitively adhered to the substrate 3a with an adhesive agent or with a pressure-sensitive adhesive agent 3h (refer to FIG. 15). Then, in order to increase a light ray transmittance of the reflective polarizing plate 3b including the substrate 3a, it is favorable that silicon oxide (SiO) films as moisture-proof films 3d having a transmission increase effect are also formed on a surface of the reflective polarizing plate 3b and on a surface opposite a pressure-sensitive adhesive surface. However, when the substrate 3a is made of a glass material, it is favorable that a general anti-reflection film is provided.

It is more favorable that a film thickness is set equivalent to ¼ of the wavelength to impart an anti-reflection characteristic to the moisture-proof film 3d described above. In this case, since most of emitted light from an LED used as a light source of the information display device 100 has a wavelength in a range of 450 nm to 650 nm, it is favorable that a film thickness of the moisture-proof film 3d serving to prevent reflection for a central wavelength of 550 nm is set between 130 nm and 145 nm. On the other hand, the generation of unwanted light can be reduced by forming an anti-reflection film 3c on the opposite surface of the substrate 3a on which the reflective polarizing plate 3b is provided.

As shown in FIG. 15, it is favorable that the reflective polarizing plate is disposed in the optical path such that image light is incident from a side opposite a surface for affixing the reflective polarizing plate 3b. The reason for this is that, as described above, most of sunlight to be incident on an inside of the vehicle is a P-polarized light, so that an optical path of reflected light reflected by the reflective polarizing plate 3b is as follows. (1) The reflected light normally returns on the optical path and is reflected by the front glass 6 to become normal reflected light returning to a driver's side. (2) In addition, sunlight incident in a more oblique direction is reflected by a side surface of the reflective polarizing plate 3b to become stray light. In order to reduce the light, the anti-reflection film 3c is provided on a sunlight-incident surface of the substrate 3a, so that reflected light to be generated by incident and emitting surfaces of the reflective polarizing plate 3b is reduced, and the generation of glare is suppressed, thereby reducing a decrease in image quality. In addition, since the reflective polarizing plate 3b has a structure to be described below, it is favorable that the reflective polarizing plate 3b is provided on a side of the substrate 3a on which sunlight is incident.

FIG. 16 is a cross-sectional view showing a specific structure of the reflective polarizing plate 3b of the present embodiment. The reflective polarizing plate 3b is adhered and fixed to a single surface of the glass substrate 3a with the adhesive agent or with the pressure-sensitive adhesive agent 3h. For example, the reflective polarizing plate WGF (registered trademark) sold by Asahi Kasei E-Materials Corporation is used as the reflective polarizing plate 3b. Here, regarding a method for manufacturing the reflective polarizing plate WGF (registered trademark), the company's technical data describes that the reflective polarizing plate 3b is obtained by shaping ultraviolet curable resin 3j on a surface of a triacetyl cellulose (TAC) film 3f of a base material through a roll-to-roll process using the nanoimprinting method, and by forming an aluminum film 3k on surfaces thereof (including side surfaces).

Generally, the TAC film has a reliability problem that the TAC film is turned yellow by ultraviolet rays contained in sunlight and transmittance greatly decreases. Therefore, regarding a configuration of the reflective polarizing plate 3b, as shown in FIG. 16, the inventors of this application and others have covered all the surfaces of the reflective polarizing plate 3b with the ultraviolet curable resin 3j of acrylic, and disposed the surface to which the reflective polarizing plate 3b has been affixed, toward a sunlight-incident side. Namely, since the ultraviolet curable resin 3j of acrylic is disposed to cover the TAC film 3f, an ultraviolet component of the sunlight is absorbed by the ultraviolet curable resin 3j, and the ultraviolet component can be prevented from causing degradation of the TAC film 3f.

In addition, the inventors of this application and others have found an optimum condition for forming the moisture-proof film 3d in FIG. 16 by taking into consideration stability after film formation and by paying attention to temperature inside a furnace during film formation. In a process of forming the moisture-proof film 3d, due to stress caused by a difference between a linear expansion coefficient of the triacetyl cellulose (TAC) film 3f that is a base material of the reflective polarizing plate 3b and a linear expansion coefficient of the ultraviolet curable resin 3j of acrylic, the ultraviolet curable resin 3j of acrylic may peel off from the TAC film 3f, which is a concern. In order to prevent this incident, silicon oxide (SiO) films as the moisture-proof films 3d are formed on the surfaces by evaporation or sputtering at low temperature. It is desirable that at this time, the temperature inside a furnace of an evaporation device or of a sputtering device is 70° C. or less in the vicinity of the substrate, and when evaporation or sputtering is performed at 50° C. or less, the performance can be more stably maintained without changing the configuration of the reflective polarizing plate 3b.

It is more favorable that as described above, the film thickness of the moisture-proof film 3d to be formed at this time is set equivalent to ¼ of a wavelength contained in transmitted light, to impart an anti-reflection characteristic to the moisture-proof film 3d. Similarly, the generation of unwanted light can be reduced by forming the anti-reflection film 3c on the opposite surface of the substrate 3a to which the reflective polarizing plate 3b is affixed. In addition, as described above, when a plurality of the anti-reflection films 3c are provided on the surface opposite the surface on which the reflective polarizing plate 3b is provided, to obtain a transmission increase effect, interface reflection is reduced, and the image quality of a displayed image is not impaired.

Figure 17:
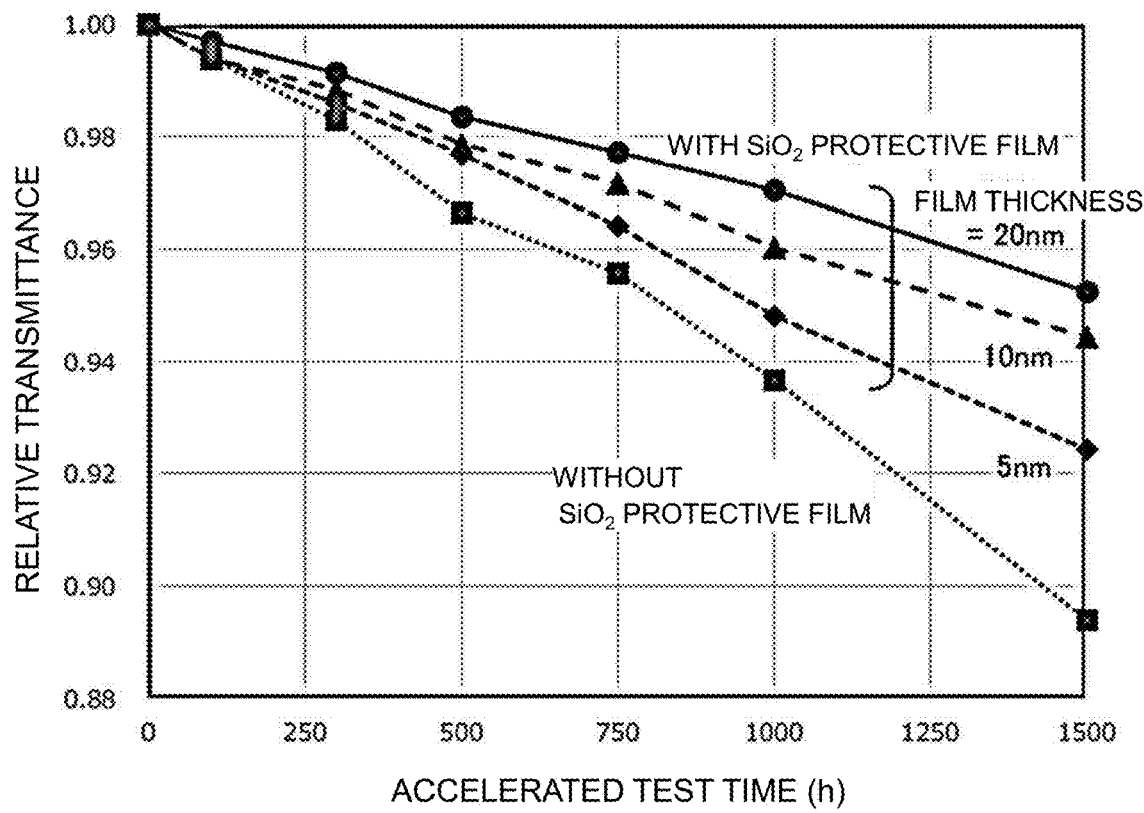
FIG. 17 is a graph showing an effect of a moisture-proof film.

FIG. 17 is a graph showing an effect of the moisture-proof film 3d. A sample for evaluating a moisture barrier property of the moisture-proof film 3d described above was left under a high-temperature and high-humidity environment of 85° C. and 85% RH, and a change in transmittance from an initial value was evaluated as a relative value. In this case, the film thickness of the moisture-proof film 3d was evaluated as a parameter. As a result, compared to a case where a protective film was not provided, the larger the thickness of the moisture-proof film 3d was, the smaller a decrease (degradation) in transmittance was, and in a sample without a protective film (single reflective polarizing plate) that had a film thickness of 20 nm, the decrease in transmittance after the elapse of 1500 hours was reduced by approximately 6%. Further, in the case of a film thickness of approximately 140 nm where a transmission increase effect was obtained, an initial transmittance was improved by approximately 1.5%, and a decrease in relative value after the elapse of 1500 hours was reduced by 4% (not shown). On the other hand, when the moisture-proof film 3d had a film thickness larger than 500 nm and was left in an atmosphere at a high temperature higher than 90° C., stress generated between the moisture-proof film 3d, the TAC film 3f, and the ultraviolet curable resin 3j due to a difference in linear expansion coefficient between the three members increased, and the shape could not be maintained.

Incidentally, for the substrate 3a of the reflective polarizing plate 3b described above, a material having high transparency other than the glass substrate is selected. In addition, the reflective polarizing plate 3b described above may be provided on an aspheric lens made of plastic or on a free-form surface lens. In this case, examples of the material having high transparency include (1) ZEONEX (registered trademark) manufactured by Zeon Corporation, (2) polycarbonate, (3) acrylic, and the like. (1) ZEONEX (registered trademark) has a water absorption rate of almost 0% and a high heat distortion temperature, but is expensive. (3) Acrylic has the highest moldability and is inexpensive, but a moisture-proof film needs to be provided to suppress moisture absorption during usage.

Further, a light transmitting plate (not shown) having a function of suppressing and removing at least one of infrared light and ultraviolet light described above may be provided in the opening portion 41 (refer to FIG. 13) formed in the upper portion of the information display device 100. The light transmitting plate can also have a function of preventing external dust from intruding into the information display device 100 in addition to the function of suppressing infrared light or ultraviolet light.

Figure 18:
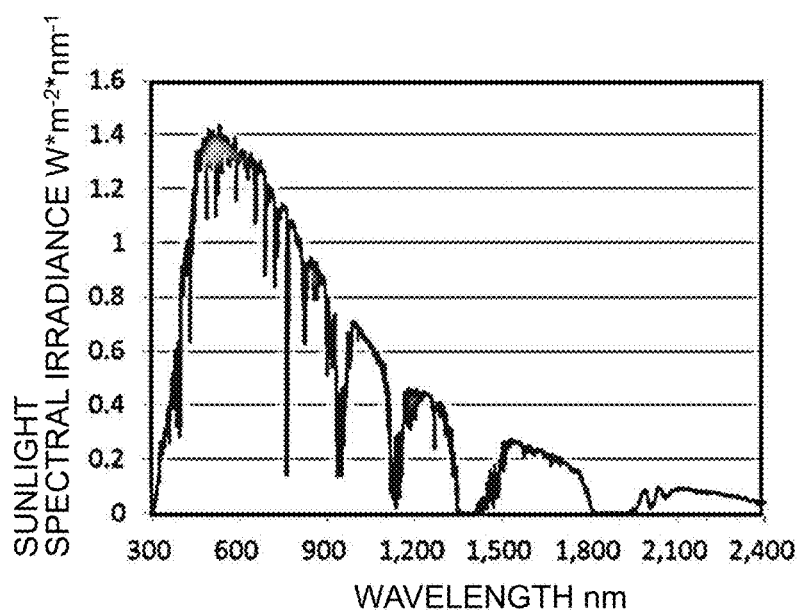
FIG. 18 is a characteristic diagram showing spectral irradiance of sunlight.

In such a manner, of sunlight containing a large number of spectral components and intruding into the information display device 100 from the opening portion 41, the information display device 100 can remove unwanted components, and selectively extract mainly visible light components. FIG. 18 shows a characteristic of spectral irradiance of sunlight.

Figure 29:
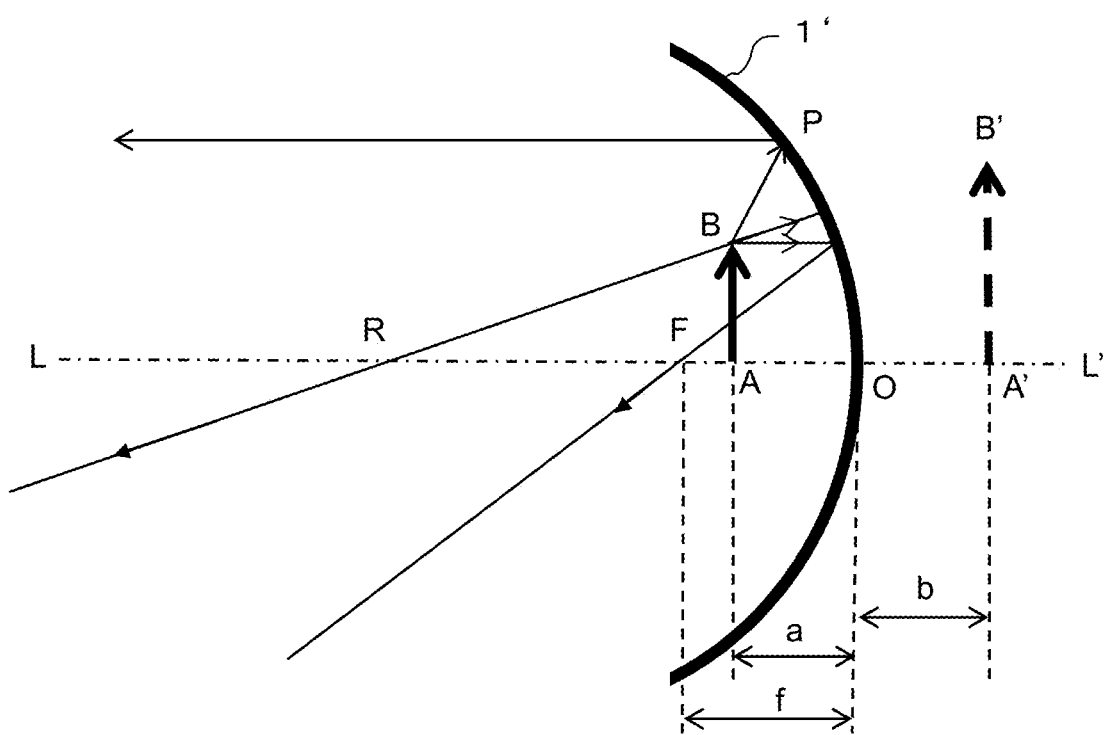
FIG. 29 is a view for describing a principle in which a virtual image is obtained by a concave surface mirror.

Next, FIG. 29 is a view for describing a principle in which a virtual image is obtained by a concave surface mirror in the information display device. A virtual image can be obtained by a concave surface mirror 1' by disposing an object point AB inside a focal point F (focal distance f) with respect to a point O on an optical axis of the concave surface mirror 1'. Here, for convenience of description, the concave surface mirror 1' is assumed to be a convex lens having the same positive refractive power, and a relationship between the object point, the convex lens (here, for convenience of description, written as the concave surface mirror), and the virtual image to be generated is shown.

When the driver views a virtual image generated by the information display device, it is desirable to simultaneously secure focusing performance of a virtual image that is reflected by an upper portion of the front glass 6 to be visible to the driver (image to be superimposed on a distant landscape) and of a virtual image that is reflected by a lower portion of the front glass 6 to be visible to the driver (image to be superimposed on a nearby landscape). For this reason, it is favorable that the image display device (AB) is inclined with respect to an optical axis LL' of the image display device (corresponding to AB in FIG. 29 and to the liquid crystal panel in the present embodiment) and of the concave surface (free-form surface) mirror 1'. This is also intended to simultaneously satisfy a magnification M=b/a of the virtual image generated by the liquid crystal panel and the concave surface (free-form surface) mirror 1'.

According to the optical configuration of the information display device 100 described above, the P-polarized light component (P wave) of sunlight intruding into the device through the front glass 6 can be more effectively reduced by the optical element 3 described above. Namely, the optical element 3 prevents sunlight that has intruded into the information display device 100 through the opening portion 41 of the upper portion, from adversely affecting the image display device 4 or the polarizing plates and the like on the periphery disposed inside the device, such as causing carbonization. Accordingly, it is possible to reduce damage to the liquid crystal display or to the polarizing plates, and to suppress a decrease in the performance of the information display device 100 caused by sunlight. In addition, it is possible to reduce an adverse influence of moisture or sulfide or the like contained in exhaust gas on the image display device 4 or on the polarizing plates and the like on the periphery by providing the moisture-proof film on the optical element 3.

<Light Source Device of Image Display Device>

As described above, in the optical system of the information display device 100, the amount of sunlight to be incident on the device from the outside through the front glass 6 is reduced by the optical element 3. At the same time, as indicated by the solid arrows in FIG. 4 or 5, image light for generating a virtual image of various image information to be displayed in front of the host vehicle is emitted from the image display device 4, and reaches the front glass 6 through the lens element 2 or through the concave surface mirror 1. In this case, the image light also passes through the optical element 3, but as already described, the S-polarized light component (S wave) is used for the image light.

Therefore, hereinafter, the image display device 4 and the light source device 10 thereof that generate image light of the S-polarized light component will be described in detail.

FIG. 19 is a configuration view showing the disposition of the image display device 4 and the light source device 10. Here, a liquid crystal display that is the image display device 4 and the light source device 10 forming a light source therebelow are shown in an exploded perspective view.

The light source device 10 includes a light source device casing 101 that is made of, for example, plastic or the like, and that accommodates LEDs, a collimator, a composite diffusion block, a light guide body, and the like to be described later thereinside. The liquid crystal display that is the image display device 4 is attached to an upper surface of the light source device casing 101. In addition, an LED substrate 102 on which LED elements that are semiconductor light sources and a control circuit thereof are mounted is attached to one side surface of the light source device casing 101, and a heat sink 103 for cooling heat generated by the LED elements and the control circuit is attached to an outer surface of the LED substrate 102.

On the other hand, the liquid crystal display that is the image display device 4 attached to the upper surface of the light source device casing 101 includes a liquid crystal display panel frame 401; a liquid crystal display panel 402 attached to the frame; and a flexible printed circuit (FPC) 403 electrically connected to the panel. Namely, as will be described later, the liquid crystal display panel 402 generates and controls an image to be displayed according to a control signal from a control circuit (not shown here) forming an electronic device, together with the LED elements that are solid-state light sources.

Subsequently, an internal configuration of the light source device 10, namely, an optical system accommodated in the light source device casing 101 will be described below in detail with reference to the drawings.

Figure 20:
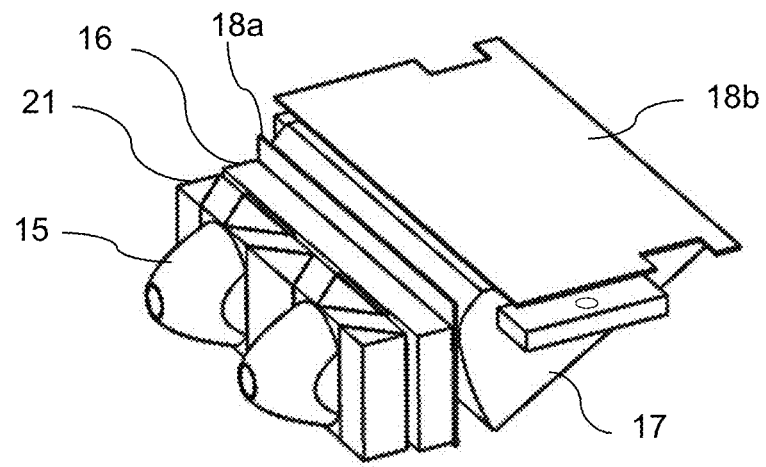
FIG. 20 is a schematic configuration view showing a configuration of the light source device.
Figure 21:
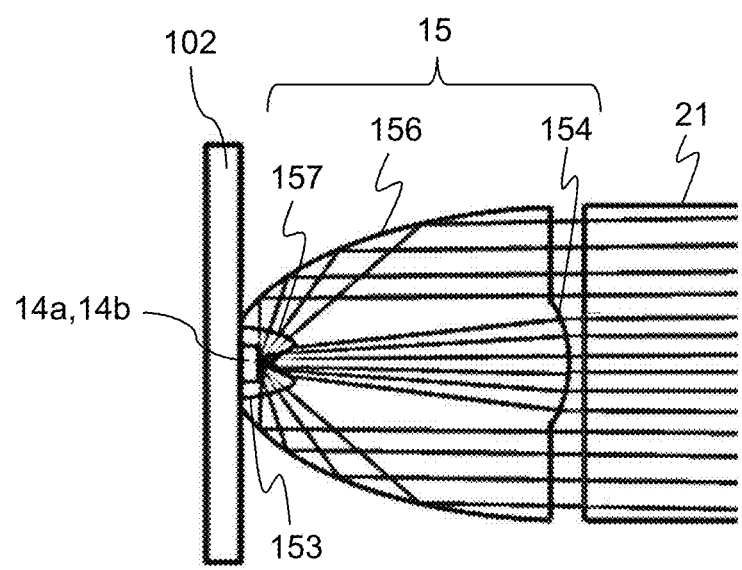
FIG. 21 is a cross-sectional view showing the propagation of light inside the light source device.
Figure 22:
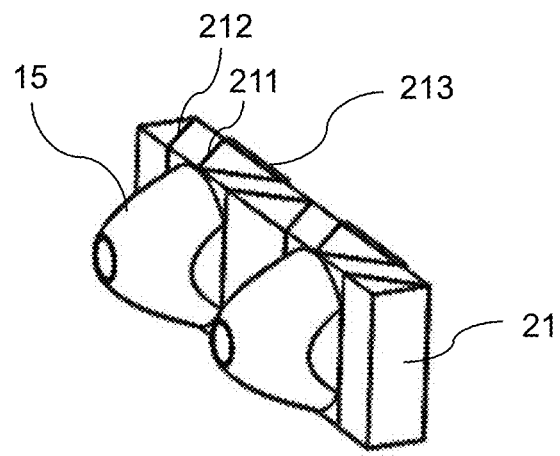
FIG. 22 is a schematic configuration view showing a shape of a polarization conversion element.

FIG. 20 is a schematic configuration view showing a configuration of the light source device 10. In addition, FIG. 21 is a cross-sectional view showing the propagation of light inside the light source device 10. In addition, FIG. 22 is a schematic configuration view showing a polarization conversion element inside the light source device 10. In this example, a plurality (in this example, two) of LEDs 14a and 14b forming a light source are shown, and these LEDs are attached to LED collimators 15 at predetermined positions. Each of the LED collimators 15 is made of, for example, light transmissive resin such as acrylic. As also shown in FIG. 21, each of the LED collimators 15 has an outer peripheral surface 156 having a conical convex shape obtained by rotating a substantially parabolic cross section, and includes a concave portion 153 at an apex portion thereof, a convex portion (namely, a convex lens surface) 157 being formed at a central portion of the concave portion 153. In addition, a convex lens surface (or may be a concave lens surface that is concave inward) 154 protruding outward is provided at a central portion of a flat portion of each of the LED collimators 15. Incidentally, the outer peripheral surfaces (parabolic surfaces) 156 having a conical shape of the LED collimators 15 are set within an angle range where light emitted from the LEDs 14a and 14b in a peripheral direction can be totally reflected thereinside, or reflective surfaces are formed.

On the other hand, the LEDs 14a and 14b are disposed at predetermined respective positions on a surface of the so-called LED substrate 102 that is a circuit substrate thereof. The LED substrate 102 is disposed and fixed to the LED collimator 15 such that the LED 14a or 14b on the surface of the LED substrate 102 is located at the central portion of the concave portion 153 of the LED collimator 15.

According to such a configuration, light radiated from the LED 14a or 14b, particularly, light radiated upward (right direction in the drawing) from a central portion thereof is condensed and collimated by the LED collimator 15 described above, namely, two convex lens surfaces 157 and 154 forming an outer shape of the LED collimator 15. In addition, light emitted from other portions in the peripheral direction is reflected by the parabolic surface forming the outer peripheral surface having a conical shape of the LED collimator 15, and is similarly condensed and collimated. In other words, according to the LED collimator 15 in which the convex lens is formed at the central portion and the parabolic surface is formed in a peripheral portion, almost all light generated by the LED 14a or 14b can be extracted as parallel light, and the use efficiency of the generated light can be improved.

As shown in FIGS. 20 and 22, a polarization conversion element 21 is provided on a light-emitting side of the LED collimators 15. The polarization conversion element 21 is configured by combining a plurality of light transmissive members each having a columnar shape with a parallelogram cross section (hereinafter, parallelogram prism shape) and of light transmissive members each having a columnar shape with a triangular cross section (hereinafter, triangular prism shape), and by arranging both the light transmissive members in an array parallel to a plane orthogonal to an optical axis of the parallel light from the LED collimators 15. Further, a polarizing beam splitter (PBS) film 211 and a reflective film 212 are alternately provided at an interface between the adjacent light transmissive members arranged in an array, and a ½λ-phase plate 213 is provided on an emitting surface from which light that has been incident on the polarization conversion element 21 and that has transmitted through the PBS film 211 is emitted.

Figure 23:
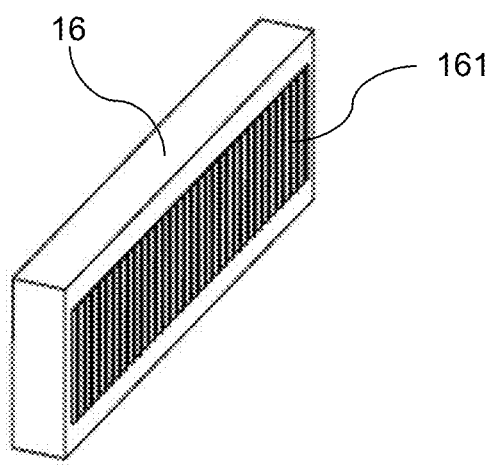
FIG. 23 is a schematic view showing a configuration of a composite diffusion block.

Further, a composite diffusion block 16 having a rectangular shape that is also shown in FIG. 20 is provided on the emitting surface of the polarization conversion element 21. Namely, the light emitted from the LED 14a or 14b is collimated by the action of the LED collimator 15, and is incident on the composite diffusion block 16. FIG. 23 is a schematic view showing a configuration of the composite diffusion block 16. The light incident on the composite diffusion block 16 is diffused by a texture 161 on an emitting side, and then reaches a light guide body 17 shown in FIG. 20.

In FIG. 20, the light guide body 17 having a prismatic shape with a substantially triangular cross section is provided on an emitting surface side of the composite diffusion block 16 with a first diffusion plate 18a sandwiched therebetween, and a second diffusion plate 18b is attached to an upper surface of the light guide body 17. Accordingly, horizontal light from the LED collimators 15 is reflected upward in the drawing and is guided to an incident surface of the liquid crystal display by the action of the light guide body 17. In this case, intensities of the incident light are made uniform by the first and second diffusion plates 18a and 18b.

Figure 24:
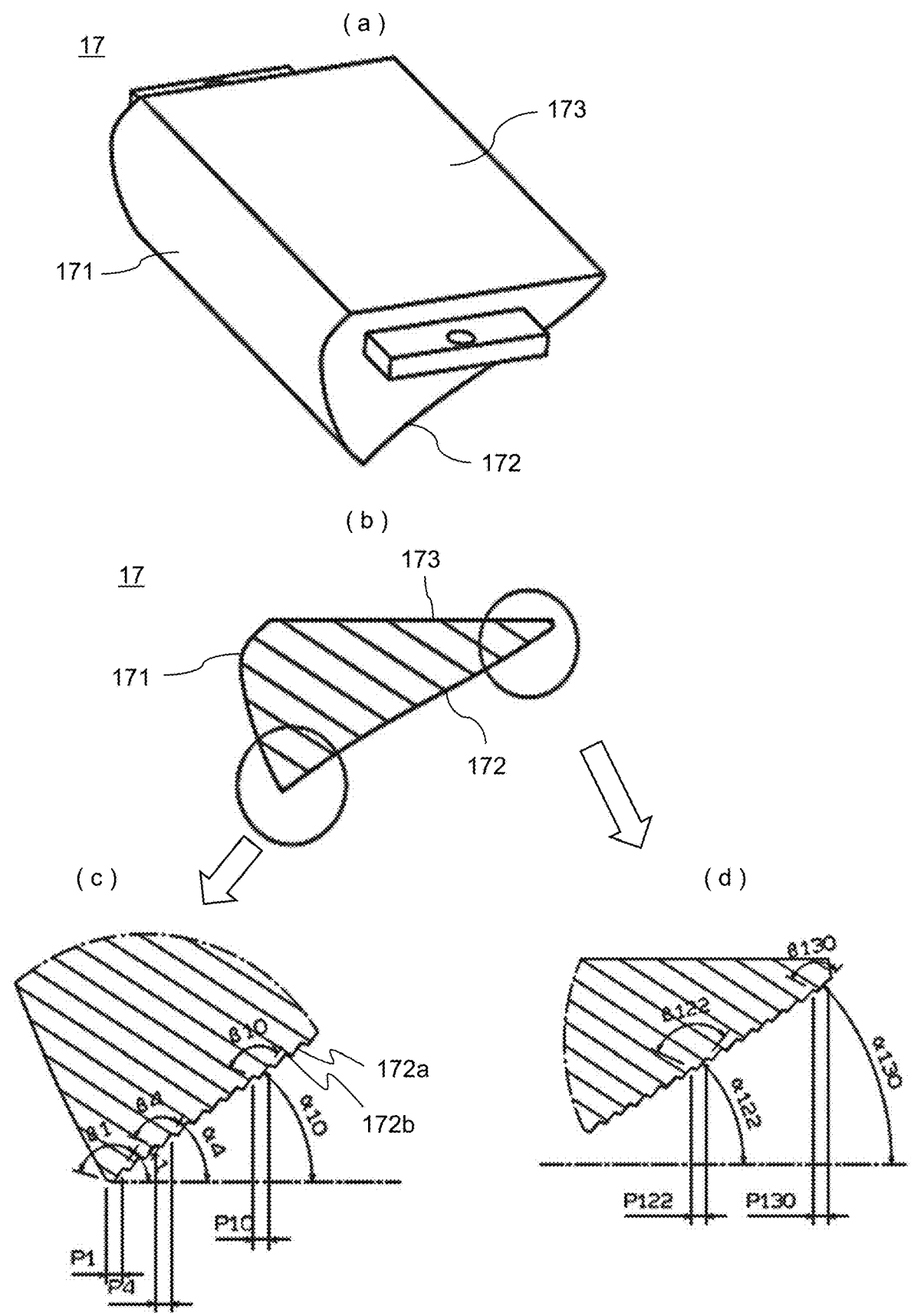
FIG. 24 is a view showing a detailed configuration of a light guide body.

FIG. 24 is a view showing a detailed configuration of the light guide body 17. Among the views, FIG. 24(a) is a perspective view showing an entirety of the light guide body 17, FIG. 24(b) is a cross-sectional view thereof, and FIGS. 24(c) and 24(d) are partial enlarged views showing details of a cross section.

The light guide body 17 is a member formed from, for example, light transmissive resin such as acrylic in a rod shape with a substantially triangular cross section (refer to FIG. 24(b)). Furthermore, as shown in FIG. 24(a), the light guide body 17 includes a light guide body light-incident portion (surface) 171 facing the emitting surface of the composite diffusion block 16 (refer to FIG. 20) through the first diffusion plate 18a; a light guide body light reflective portion (surface) 172 forming a slope; and a light guide body light-emitting portion (surface) 173 facing the liquid crystal display panel 402 of the liquid crystal display (refer to FIG. 19) through the second diffusion plate 18b.

In addition, as shown in the partial enlarged views of FIGS. 24(c) and 24(d), a large number of reflective surfaces 172a and connecting surfaces 172b are alternately formed in a sawtooth shape in the light guide body light reflective portion (surface) 172 of the light guide body 17. Then, each of the reflective surfaces 172a (line segment upward to the right in the drawings) forms an angle of $\alpha n$ (n: natural number and 1 to 130 in this example) with respect to a horizontal plane shown by an alternate long and short dashed line, and as one example, here, $\alpha n$ is set to 43 degrees or less (but, 0 degrees or more).

On the other hand, each of the connecting surfaces 172b (line segment downward to the right in the drawings) forms an angle of $\beta n$ (n: natural number and 1 to 130 in this example) with respect to the corresponding reflective surface. Namely, the connecting surfaces 172b of the reflective portion are inclined with respect to incident light at a negative angle within the range of a half-value angle of a scatterer to be described later. Although will be described later, $\alpha n$ is a reflective surface elevation angle, and $\beta n$ is a relative angle between the reflective surface and the connecting surface. As one example, the relative angle $\beta n$ is set to 90 degrees or more (but, 180 degrees or less), and in this example, all the relative angles are equal ($\beta 1 = \beta 2 = \beta = \ldots = \beta 130$).

Figure 25:
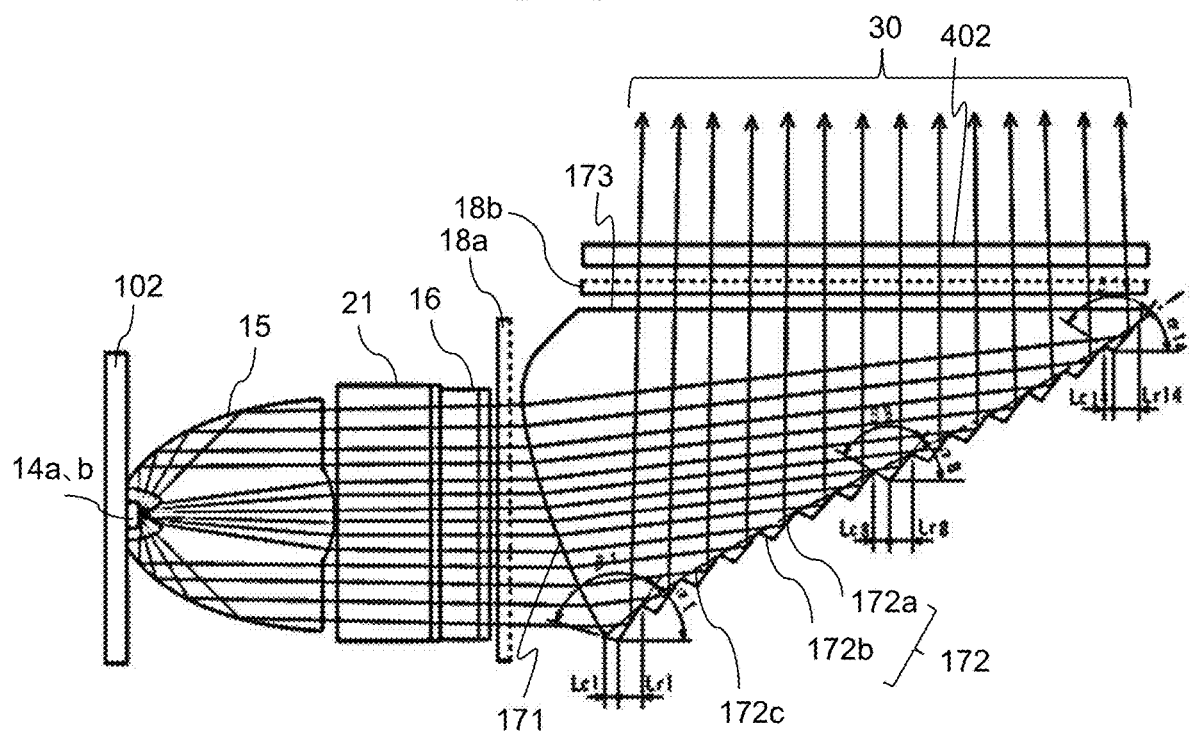
FIG. 25 is an enlarged view of a light guide body light reflective portion (surface).

FIGS. 25 and 26 are enlarged views of the light guide body light reflective portion (surface) 172 of the light guide body 17. Here, for the sake of description, the sizes of the reflective surfaces 172a and the connecting surfaces 172b are shown as being relatively larger than the size of the light guide body 17. First, as shown in FIG. 26(b), at the light guide body light-incident portion (surface) 171 of the light guide body 17, main light rays are deflected by $\delta$ in a direction in which the incident angle with respect to the reflective surfaces 172a increases. Namely, the light guide body light-incident portion (surface) 171 is formed in a curved convex shape inclined toward a light source side. According to this configuration, the parallel light from the emitting surface of the composite diffusion block 16 is diffused through the first diffusion plate 18a, is incident on the light guide body light-incident portion (surface) 171, and as clear from the drawings, reaches the light guide body light reflective portion (surface) 172 while being slightly bent (deflected) upward by the light guide body light-incident portion (surface) 171.

A large number of the reflective surfaces 172a and the connecting surfaces 172b are alternately formed in a sawtooth shape in the light guide body light reflective portion (surface) 172. The diffused light from the first diffusion plate 18a is totally reflected by each of the reflective surfaces 172a, travels upward, and is incident on the liquid crystal display panel 402 of the liquid crystal display through the light guide body light-emitting portion (surface) 173 or through the second diffusion plate 18b (shown in FIG. 25) as parallel diffused light. For this reason, the reflective surface elevation angle $\alpha n$ is set such that each of the reflective surfaces 172a forms an angle equal to or larger than a critical angle with respect to the diffused light. On the other hand, the relative angle $\beta n$ between the reflective surface 172a and the connecting surface 172b is set to a constant angle as described above, more preferably an angle of 90 degrees or more.

With the above-described configuration, since each of the reflective surfaces 172a always forms an angle equal to or larger than the critical angle with respect to the diffused light, even when a reflective film such as metal is not formed on the light guide body light reflective portion 172, total reflection becomes possible, and the light source device 10 of low cost can be realized.

In addition, the reflective surface elevation angle $\alpha n$ increases in value little by little as the position moves from a lower portion to an upper portion of the light guide body light reflective portion (surface) 172. This is intended to prevent a situation where since light that has transmitted through the liquid crystal display panel 402 of the liquid crystal display has a certain degree of divergence angle, particularly, some of light that has transmitted through a peripheral portion of the liquid crystal display panel 402 is shaded by a peripheral edge of the mirror disposed downstream, and peripheral dimming occurs. Namely, as shown by light rays 30 of FIG. 25, peripheral dimming is prevented by employing a configuration in which light rays in the peripheral portion are slightly deflected in a central axis direction.

In addition, in FIG. 25, Lr1, Lr2, Lr3, represent projection lengths of the reflective surfaces 172a with respect to a horizontal plane, Lc1, Lc2, Lc3, represent projection lengths of the connecting surfaces 172b with respect to the horizontal plane, and a ratio Lr/Lc between the projection lengths of the reflective surface 172a and the connecting surface 172b is configured to be changeable depending on the location. An intensity distribution of the main light rays 30 to be incident on the light guide body 17 does not necessarily coincide with a desired intensity distribution at the incident surface of the liquid crystal display panel. Therefore, a configuration is employed in which the intensity distribution is adjusted by the ratio Lr/Lc between the reflective surface 172a and the connecting surface 172b. Incidentally, the higher the ratio is, the higher an average intensity of reflected light at the portion can be. Generally, the light rays 30 to be incident on the light guide body 17 tends to be strong at a central portion. In order to correct this tendency, the ratio Lr/Lc is set to differ depending on the location, and the ratio Lr/Lc is set to be small particularly at the central portion. Since the ratio Lr/Lc is configured to differ depending on the location, and the reflective surface elevation angle $\alpha n$ described above is configured to differ depending on the location, an envelope 172c representing a general shape of the light guide body light reflective portion 172 has a curved shape as shown in FIG. 25.

Further, regarding the projection lengths Lr and Lc of the reflective surface 172a and the connecting surface 172b, a sum Lr+Lc of both is set to a constant value at each position and is set to 0.6 mm or less. Namely, a relationship of Lr1+Lc1=Lr2+Lc2= . . . 0.6 mm is established. With such a configuration, a repetition pitch of the reflective surfaces when viewed from the light guide body light-emitting surface 173 of the light guide body 17 can be set the same. In addition, since the pitch is 0.6 mm or less, in combination with actions and effects of the diffusion plates 18a and 18b, when viewed through the liquid crystal display panel 402, the individual emitting surfaces appear as a continuous surface without being separated from each other. Therefore, spatial luminance over the liquid crystal display panel 402 is made uniform, so that display characteristics are improved. Namely, with this configuration, an intensity distribution of incident light on the liquid crystal display panel 402 can be made uniform. Incidentally, when a value of Lr+Lc is too small, since not only does the processing time increases, but also it becomes difficult to process each of the reflective surfaces 172a with high accuracy, practically, it is desirable that a lower limit value of Lr+Lc is set to 0.2 mm.

According to the shape of the light guide body light reflective portion (surface) 172 of the light guide body 17 described above, a total reflection condition of main light can be satisfied, it is not necessary to provide a reflective film such as aluminum on the light guide body light reflective portion 172, light can be efficiently reflected, it is not necessary to perform evaporation work of an aluminum thin film involving an increase in manufacturing cost, and the light source for generating a bright S-polarized light component (S wave) can be realized at a lower cost. In addition, regarding the relative angle β, each of the connecting surfaces 172b is set at a negative angle with respect to the light rays 30 diffused by the composite diffusion block 16 and by the diffusion plate 18a. Accordingly, unwanted light is prevented from being incident on the connecting surfaces 172b, so that the reflection of unwanted light can be reduced, and the light source device with good characteristics can be realized.

In addition, according to the light guide body 17 described above, a length of the light guide body light-emitting surface 173 in an optical axis direction can be freely changed by appropriately changing the reflective surface elevation angle αn. Therefore, it is possible to realize the light source device in which a size (surface size) of the light guide body light-emitting surface 173 with respect to the light guide body light-incident portion (surface) 171 can be appropriately changed to a size (surface size) suitable for a device such as the liquid crystal display panel 402. In addition, accordingly, since the light guide body light-emitting surface 173 can be made to have a desired size without depending on a disposition shape of the LEDs 14a and 14b forming a light source, a planar light emitting source of a desired size can be obtained. Further, such a configuration leads to securing the degree of freedom in design including the disposition of the LEDs 14a and 14b forming a light source, and is advantageous in reducing the size of the entire device.

Figure 27:
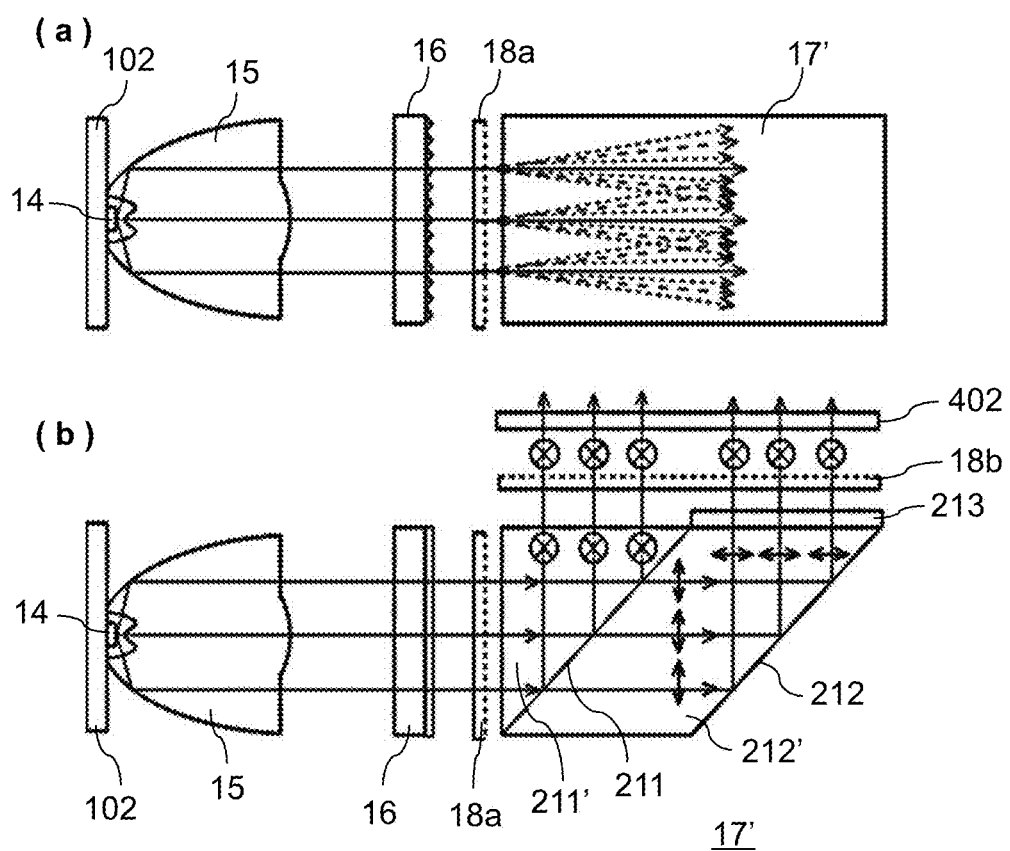
FIG. 27 is a configuration view using a polarization conversion element as the light guide body.

FIG. 27 shows a case where a polarization conversion element is used as the above-described light guide body. Namely, the light guide body 17 disposed behind the composite diffusion block 16 is formed of a polarization conversion element instead of normal light transmissive resin, and the polarization conversion element is shown as a light guide body 17'. The light guide body 17' is a combination of a light transmissive member 211' having a triangular prism shape and a light transmissive member 212' having a parallelogram prism shape, and the PBS film 211 is formed on a boundary surface therebetween. The PBS film 211 reflects an S-polarized light (refer to symbol (x) in the drawing) of incident light emitted from an LED 14 and collimated by the LED collimator 15, and transmits a P-polarized light (refer to up and down arrows in the drawing). The ½λ-phase plate 213 is formed on an upper surface of the light transmissive member 212' having a parallelogram prism shape, and the reflective film 212 is formed on a side surface of the light transmissive member 212'. formed on a side surface of the light transmissive member 212'.

According to this configuration, the incident light emitted from the LED 14 and collimated by the LED collimator 15 is polarized into a S-polarized light by the light guide body 17' formed of a polarization conversion element, and is emitted upward from an upper surface of the element. Namely, in this configuration, the light guide body 17 made of normal light transmissive resin can be removed, and a great reduction in the size of the device or a reduction in the manufacturing cost of the device can be achieved.

Since the light source device 10 described above is used as a light source device of the liquid crystal display that is the image display device 4, a compact and highly efficient modularized light source device for generating an S-polarized light can be realized with a smaller number of light emitting sources (the number of LEDs and power consumption). Furthermore, the concave surface mirror 1 or the optical element 3 described above can remove unwanted infrared rays (IR) or ultraviolet rays (UV), and effectively reduce the P-polarized light component (P wave) adversely affecting the image display device 4, the polarizing plates, and the like such as causing carbonization. Accordingly, it is possible to realize the information display device 100 capable of reducing damage caused by sunlight and of performing better information display using the S-polarized light component S wave).

As described above in detail, according to the information display device 100 of the present embodiment, it is possible to further improve the light use efficiency or the uniform lighting characteristic, and at the same time, it is possible to manufacture a compact device including a modularized light source device for generating an S-polarized light at low cost. Incidentally, in the above description, the polarization conversion element 21 has been described as being attached to a rear side of the LED collimators 15, but the present invention is not limited to the configuration, and even when the polarization conversion element 21 is provided on the optical path leading to the liquid crystal display, the same actions and effects are obtained.

<Other Configurations>

According to the information display device 100 described above, during operation, the concave surface mirror 1 or the optical element 3 can remove unwanted IR light or UV light and P-polarized light of sunlight. However, for example, in a state where a vehicle is stopped in a parking lot or the like and an engine key is off, a display operation of the information display device 100 is unnecessary. Therefore, in such a state, intruding sunlight is excluded from a normal optical path. Namely, sunlight is prevented from intruding into the information display device 100 through the opening portion 41 of the upper portion, and from passing through the optical path leading to the image display device 4 or to the polarizing plates and the like disposed in front of and behind the image display device 4.

Figure 28:
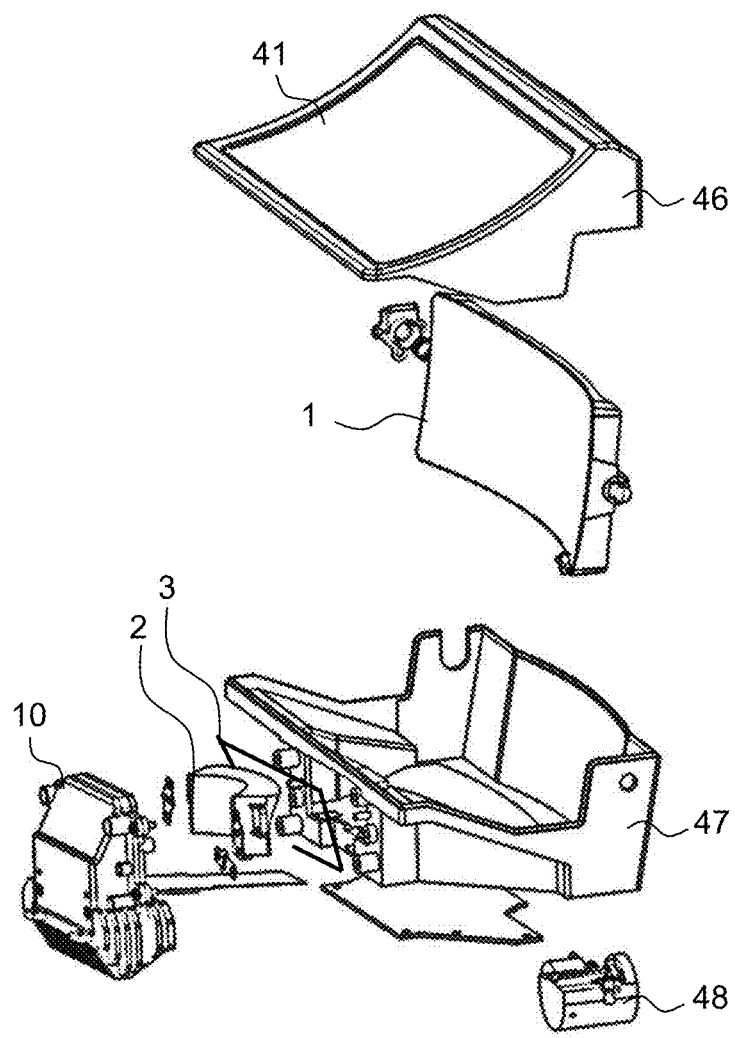
FIG. 28 is a configuration view in which sunlight is prevented from reaching an image display device.

FIG. 28 is a view showing a configuration example in which sunlight is prevented from reaching the image display device 4. FIG. 28 is an exploded perspective view of the information display device 100 with each component disassembled, when viewed from a back side. The concave surface mirror 1 is rotatably attached inside exterior casings 46 and 47 forming a housing. A position of the concave surface mirror 1 is adjusted by a concave surface mirror drive unit 48 formed of an electric motor or the like, to be moved to a position set in advance such that intruding sunlight is reflected in a direction in which the sunlight does not reach the image display device 4 (direction different from the normal optical path).

Namely, when the information display device 100 is not used, sunlight condensed by the concave surface mirror 1 is prevented from returning to the image display device 4 by rotating the concave surface mirror 1 by a predetermined angle such that the sunlight does not return to the image display device 4. Incidentally, the operation of the concave surface mirror drive unit 48 is realized through the execution of software stored in a ROM 34 in advance by a CPU 35 included in the control device 40 shown in FIG. 1.

According to this configuration, it is possible to more reliably prevent a situation where in a stop state of the vehicle where intruding sunlight becomes problem, particularly, under strong sunlight in the midsummer or the like, sunlight damages and degrades the image display device 4 and the polarizing plates on the periphery that are optical components of the information display device 100, and the light source device 10 and the like.

The characteristics of the information display device of the present embodiment described above are summarized as follows. In the virtual image optical system from the concave surface mirror to the image display device (liquid crystal panel), (1) even when P-polarized light of sunlight components that have passed through the front glass under a predetermined condition in the daytime (in a combiner method, have also passed through the combiner thereafter) is condensed by the concave surface mirror, the P-polarized light is reflected by the reflective polarizing plate that is P-polarized light component suppressing optical means provided inside the optical system, and does not return to the liquid crystal panel and to the polarizing plates, (2) when the information display device is not used, sunlight condensed by the concave surface mirror is prevented from returning to the image display device by rotating the concave surface mirror by a predetermined angle such that the sunlight does not return to the image display device, (3) the information display device is provided which the optical element for preventing some of sunlight from returning to the viewpoint (eyes) of the driver is provided to greatly improve resistance to external light including sunlight and image quality, (4) the reflective polarizing plate and the light source that supplies specific polarized light are provided together to improve the degree of polarization of image light and to improve contrast performance, and (5) the moisture-proof film (protective film) for obtaining high reliability of the reflective polarizing plate against temperature, humidity, sulfide, and the like is provided on the surface to reduce a degradation in characteristics caused by a change of the structure induced by the influence of outside air.

Various embodiments have been described above, but the present invention is not limited to the above-described embodiments, and includes various modification examples. For example, in the above embodiment, the entire system has been described in detail to facilitate understanding of the present invention, and the present invention is not necessarily limited to including all the described configurations. In addition, a part of a configuration of an embodiment can be replaced with a configuration of another embodiment, and a configuration of another embodiment can be added to a configuration of an embodiment. In addition, other configurations can be added to, removed from, or replaced with a part of a configuration of each embodiment.

REFERENCE SIGNS LIST

1 Concave surface mirror
2 Lens element
3 Optical element (reflective polarizing plate, P-polarized light component suppressing optical means)
3a Substrate (glass substrate)
3b Reflective polarizing plate
3d Moisture-proof film
3h Adhesive agent (pressure-sensitive adhesive agent)
4 Image display device (liquid crystal display, liquid crystal display panel)
6 Projected member (front glass)
7 Housing
8 Eyepoint (viewpoint of viewer)
10 Light source device
14 LED
15 LED collimator
16 Composite diffusion block
17 Light guide body
18a, 18b Diffusion plate
21 Polarization conversion element
41 Opening portion
48 Concave surface mirror drive unit
100 Information display device
VI Virtual image

The invention claimed is:

1. An information display device that displays image information as a virtual image on a projection surface, the device comprising:
    inside a housing including an opening portion at a part of the housing,
    an image display device configured to generate image light for displaying the image information that is S-polarized light;
    a first optical element configured to perform a predetermined optical process on the image light from the image display device;
    a concave surface mirror configured to project the image light from the first optical element on the projection surface through the opening portion of the housing such that a viewer can recognize the image information as the virtual image in front of the projection surface;
    a second optical element including a reflective polarizing plate fixed to a substrate having a transmissive property with an adhesive agent or with a pressure-sensitive adhesive agent in a part of an optical path inside the housing, the second optical element selectively reflecting a P-polarized light component of light in a visible light region; and a suppression material configured to suppress at least one of light rays in an infrared region and in an ultraviolet region in the optical path inside the housing.

2. The information display device according to claim 1, wherein the reflective polarizing plate selectively reflects the P-polarized light component of the light in the visible light region, and transmits an S-polarized light component with a specific transmittance, so that a degree of polarization of the image light from the image display device increases, and contrast performance is improved.

3. The information display device according to claim 1, wherein the image display device includes a solid-state light source configured to generate S-polarized light.

4. The information display device according to claim 1, wherein the second optical element further includes a moisture-proof film on a surface of the reflective polarizing plate.

5. The information display device according to claim 4, wherein the moisture-proof film has a film thickness of 130 nm to 145 nm.

6. The information display device according to claim 4, wherein the moisture-proof film on has a film thickness set to ¼ of a wavelength output by the image display device.

7. The information display device according to claim 1, wherein the suppression material is configured to reflect or absorb at least one of light rays in the infrared region and in the ultraviolet region.

8. The information display device according to claim 7, wherein the suppression material is on the concave surface mirror.

9. The information display device according to claim 7, wherein the suppression material is in the opening portion.

10. The information display device according to claim 1, wherein the second optical element is inclined with respect to an optical axis between the concave surface mirror and the projection surface.

11. An information display device that displays image information as a virtual image on a projection surface, the device comprising:

inside a housing including an opening portion at a part of the housing, an image display device configured to generate image light for displaying the image information;

a first optical element configured to perform a predetermined optical process on the image light from the image display device;

a concave surface mirror configured to project the image light from the first optical element on the projection surface through the opening portion of the housing such that a viewer can recognize the image information as the virtual image in front of the projection surface; and a second optical element including a reflective polarizing plate is fixed to a substrate having a transmissive property with an adhesive agent or with a pressure-sensitive adhesive agent in an optical path inside the housing, wherein the substrate is made of transmissive resin that selectively reflects a P-polarized light component of light in a visible light region, and a shape of the substrate corrects aberrations of the virtual image.

12. The information display device according to claim 11, wherein the reflective polarizing plate selectively reflects the P-polarized light component of the light in the visible light region, and transmits an S-polarized light component with a specific transmittance, so that a degree of polarization of the image light from the image display device increases.

13. The information display device according to claim 11, wherein the second optical element is inclined with respect to an optical axis between the concave surface mirror and the projection surface.

14. The information display device according to claim 11, wherein the second optical element further includes a moisture-proof film on a surface of the reflective polarizing plate.

15. The information display device according to claim 14, wherein the moisture-proof film has a film thickness of 130 nm to 145 nm.

16. The information display device according to claim 14, wherein the moisture-proof film on has a film thickness set to ¼ of a wavelength output by the image display device.

17. The information display device according to claim 11, wherein the image display device configured to output S-polarized light.

* * * * *